(12) United States Patent
Tagawa et al.

(10) Patent No.: US 7,069,693 B2
(45) Date of Patent: *Jul. 4, 2006

(54) TRANSPLANT YIELD MAXIMIZATION SYSTEM FOR GROWING PLANTS

(75) Inventors: Kenneth K. Tagawa, Brighton, CO (US); George H. Tagawa, Brighton, CO (US); Randall E. Tagawa, Broomfield, CO (US); William A. Kluth, Broomfield, CO (US)

(73) Assignee: Tagawa Greenhouses, Inc., Brighton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/922,428

(22) Filed: Aug. 19, 2004

(65) Prior Publication Data

US 2005/0045079 A1    Mar. 3, 2005

Related U.S. Application Data

(63) Continuation of application No. 10/470,282, filed as application No. PCT/US02/02257 on Jan. 24, 2002, now Pat. No. 6,779,300.

(60) Provisional application No. 60/296,915, filed on Jun. 8, 2001, provisional application No. 60/276,874, filed on Mar. 14, 2001, provisional application No. 60/273,420, filed on Mar. 5, 2001, provisional application No. 60/263,802, filed on Jan. 24, 2001.

(51) Int. Cl.
*A01G 9/02* (2006.01)

(52) U.S. Cl. ........................................ 47/66.7

(58) Field of Classification Search .................. 47/66.5
See application file for complete search history.

(56) References Cited

U.S. PATENT DOCUMENTS

| 3,331,155 A | 7/1967 | Chancellor ..................... 47/37 |
| 3,386,608 A | 6/1968 | Diller ......................... 220/23.6 |
| 3,446,164 A | 5/1969 | Huang et al. ................... 111/3 |
| 3,447,261 A | 6/1969 | Hundt ....................... 47/34.13 |
| 3,517,629 A | 6/1970 | Bridges et al. ................ 111/96 |
| 3,524,419 A | 8/1970 | Middleton et al. .............. 111/2 |
| 3,561,158 A | 2/1971 | Marcan ..................... 47/34.13 |
| 3,571,971 A | 3/1971 | Broersma ....................... 47/1 |

(Continued)

FOREIGN PATENT DOCUMENTS

GB    2201323 A    9/1988

(Continued)

OTHER PUBLICATIONS

U.S. Appl. No. 60/263,802, entitled "Growing System to Maximize Plant Transplanting Yields", filed Jan. 24, 2001.

(Continued)

*Primary Examiner*—Francis T. Palo
(74) *Attorney, Agent, or Firm*—Santangelo Law Offices, P.C.

(57) ABSTRACT

A growing system for plant seedlings that takes into consideration the varied requirements of the seedling; seedling and transplant environment; seedling cell size; mechanical transplanter requirements; seedling leaf, stem and root development and coordinates all these requirements to increase transplanting yields which may include larger containers that maximize yield and minimize damage. Aspects may eliminate left-over seedlings, reduce the number of manual steps, decrease labor, and increase transplant yields.

85 Claims, 21 Drawing Sheets

U.S. PATENT DOCUMENTS

| | | | |
|---|---|---|---|
| 3,712,252 A | 1/1973 | Huang | 111/2 |
| 3,799,078 A | 3/1974 | Blackmore et al. | 111/2 |
| 3,820,480 A | 6/1974 | Blackmore et al. | 111/2 |
| 3,903,643 A | 9/1975 | Blackmore et al. | 47/34.13 |
| 3,949,523 A | 4/1976 | Lehtipuu | 47/34.13 |
| 4,050,921 A | 9/1977 | Plant et al. | 71/94 |
| 4,106,414 A | 8/1978 | Vastag | 111/1 |
| 4,120,692 A | 10/1978 | Plant et al. | 71/94 |
| 4,197,674 A | 4/1980 | Blackmore, Jr. | 47/73 |
| 4,244,308 A | 1/1981 | Vince | 111/89 |
| 4,248,014 A | 2/1981 | Williams | 47/86 |
| 4,389,814 A | 6/1983 | Andreason et al. | 47/73 |
| 4,408,549 A | 10/1983 | Qvarrstrom | 111/2 |
| D272,726 S | 2/1984 | Kaneko | D11/2 |
| 4,481,893 A | 11/1984 | Qvarrstrom | 111/2 |
| D278,323 S | 4/1985 | Blackmore, Jr. | D11/155 |
| 4,616,578 A | 10/1986 | Talbott | 111/2 |
| 4,644,880 A | 2/1987 | Branch | 111/3 |
| 4,910,146 A | 3/1990 | Tur-Kaspa et al. | 435/284 |
| 4,947,579 A | 8/1990 | Harrison et al. | 47/1.01 |
| 4,947,582 A | 8/1990 | Visser | 47/101 |
| 5,048,434 A | 9/1991 | Forster et al. | 111/105 |
| 5,179,800 A | 1/1993 | Huang | 47/73 |
| 5,215,550 A | 6/1993 | Tesch, Jr. et al. | 47/1.01 |
| 5,225,345 A | 7/1993 | Suzuki et al. | 435/284 |
| 5,247,761 A | 9/1993 | Miles et al. | 47/1.01 |
| 5,257,889 A | 11/1993 | Suzuki et al. | 414/417 |
| 5,298,041 A | 3/1994 | Huang | 47/58 |
| 5,320,649 A | 6/1994 | Holland | 47/1.01 |
| 5,365,693 A | 11/1994 | Van Wingerden et al. | 47/1.01 |
| 5,425,202 A | 6/1995 | Mekler | 47/58 |
| 5,507,116 A | 4/1996 | Gao | 47/18 |
| 5,557,881 A | 9/1996 | Bouldin et al. | 47/1.01 |
| 5,573,558 A | 11/1996 | Huang | 47/1.01 |
| 5,644,999 A | 7/1997 | Williams | 111/105 |
| 5,779,048 A | 7/1998 | Dunn | 206/449 |
| 5,779,049 A | 7/1998 | Werby et al. | 206/451 |
| 5,868,086 A | 2/1999 | Williames | 111/105 |
| 5,871,102 A | 2/1999 | Lambert | 206/738 |
| 5,935,841 A | 8/1999 | Trinci et al. | 435/254.1 |
| 5,979,111 A | 11/1999 | Brown et al. | 47/59 |
| D419,913 S | 2/2000 | Thomas et al. | D11/156 |
| 6,029,425 A | 2/2000 | Dunn | 53/449 |
| 6,085,462 A | 7/2000 | Thomas | 47/87 |
| 6,357,180 B1 | 3/2002 | Huang | 47/73 |
| 6,385,903 B1 | 5/2002 | Diller et al. | 47/66.5 |
| 2004/0079263 A1 | 4/2004 | Tagawa et al. | 111/101 |

FOREIGN PATENT DOCUMENTS

WO     WO 02/058455 A1     8/2002

OTHER PUBLICATIONS

U.S. Appl. No. 60/276,874, entitled "Automated Plant Transplanting System", filed Mar. 14, 2001.

U.S. Appl. No. 60/273,420, entitled "Coordinated Plant Transplanting System", filed Mar. 5, 2001.

U.S. Appl. 60/296,915, entitled "Operational System for Transplanting Growing Plants", filed Jun. 8, 2001.

PCT International Search Report, PCT/US02/02257, mailed Jun. 11, 2002, International Filing Date Jan. 24, 2002, Priority Date Jan. 24, 2001.

PCT International Preliminary Examination Report, PCT/US02/02257, International Filing Date Jan. 24, 2002, Priority Date Jan. 24, 2001; completion date Oct. 22, 2002.

PCT Application PCT/US02/02257, International Filing Date Jan. 24, 2002, Priority Date Jan. 24, 2001, entitled "Plant Growing System to Maximize Transplant Yield".

US Appl. No. 10/470,282 filed Jul. 24, 2003 entitled Plant Growing System to Maximize Transplant Yield, as originally filed in PCT/US02/02257, along with Article 34 amendments and a Preliminary Amendment and 21 drawings.

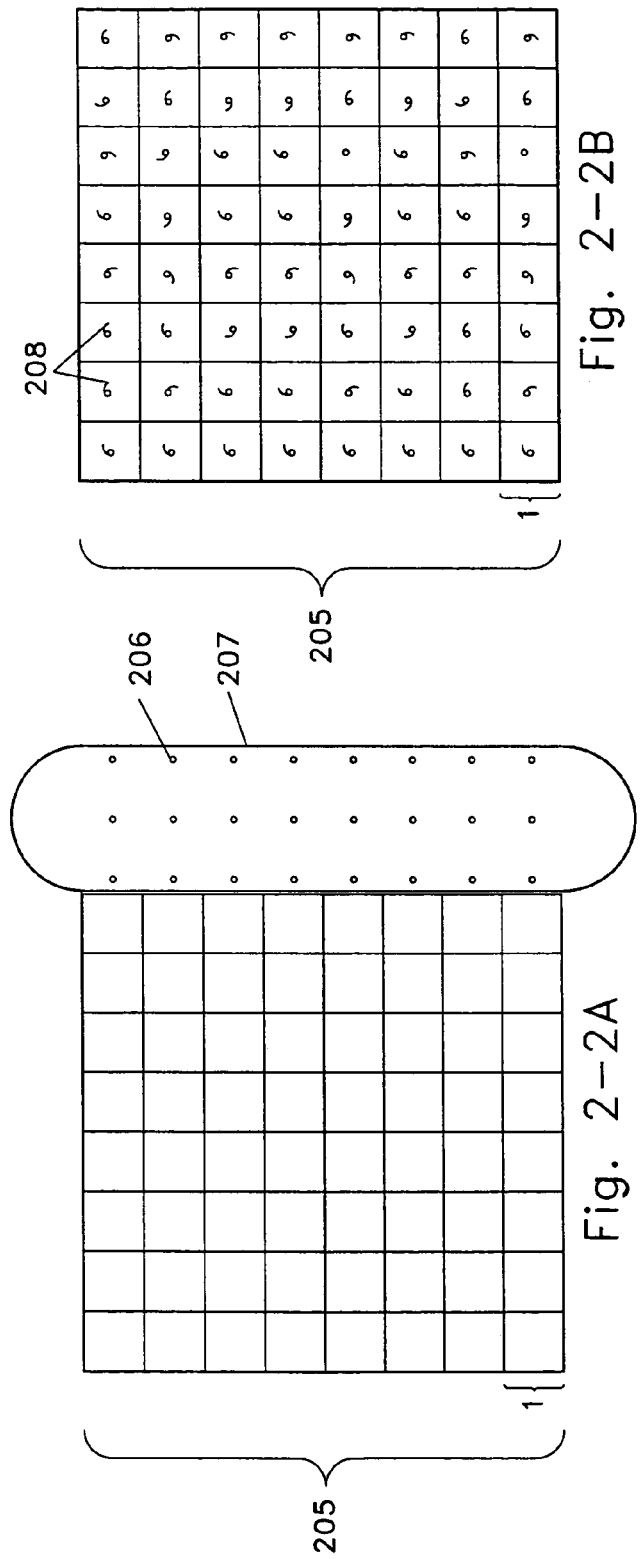
Fig. 2-2A
Fig. 2-2B
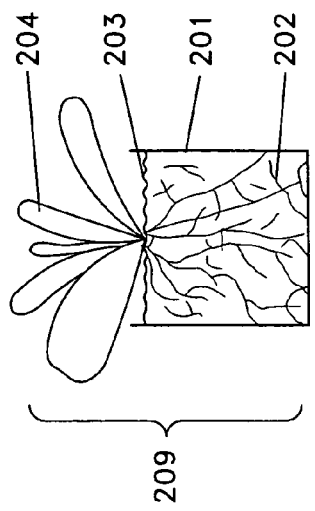
Fig. 2-2D
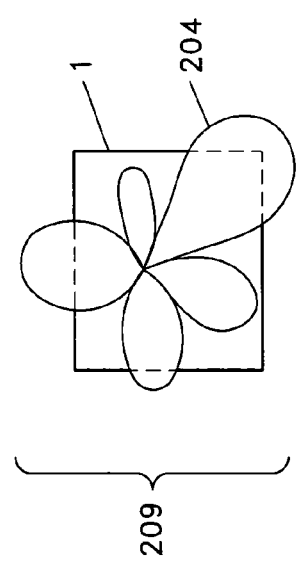
Fig. 2-2C

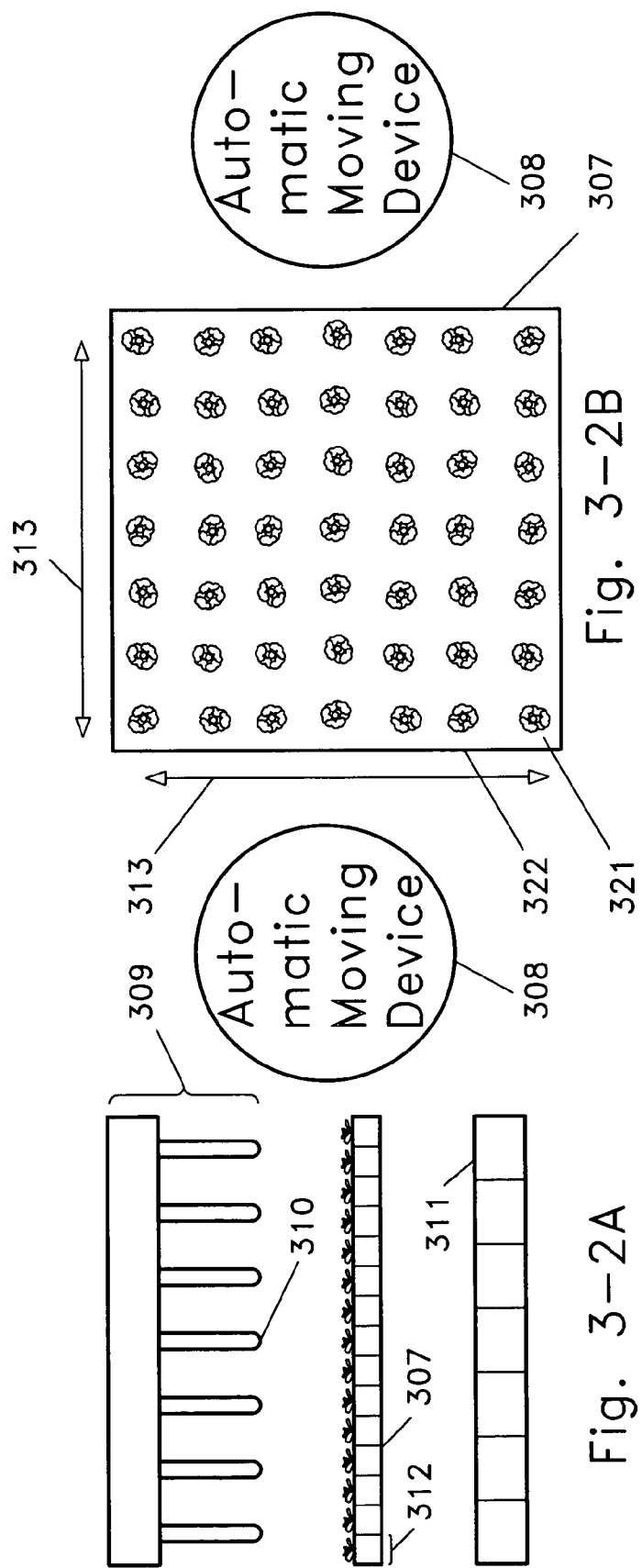

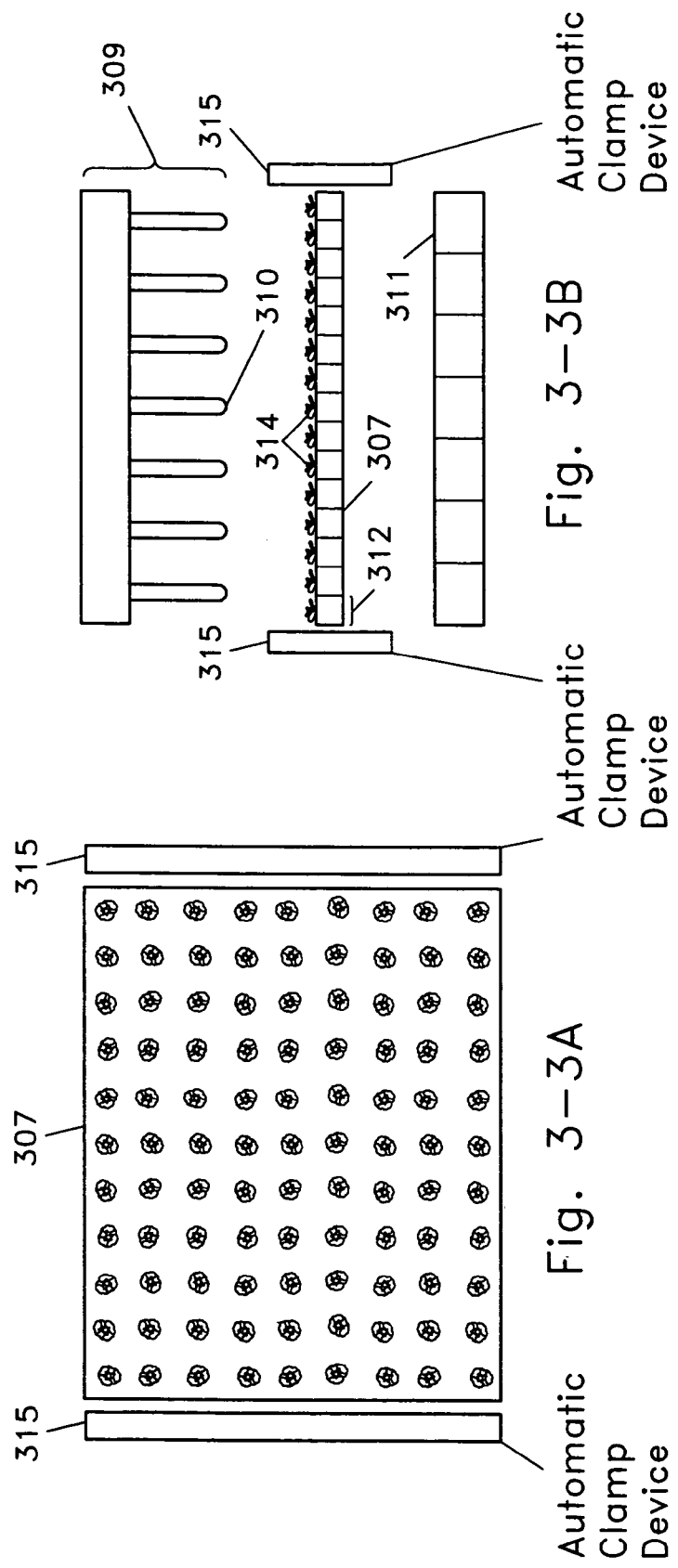

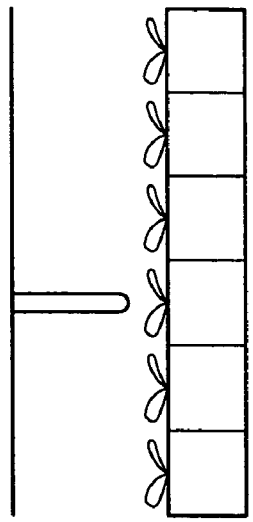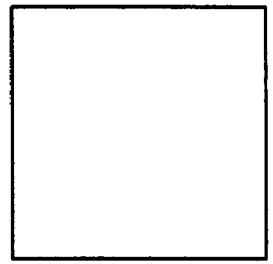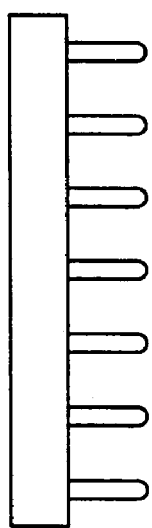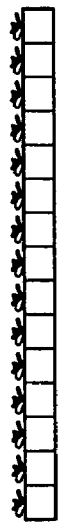
Fig. 3-4A
Fig. 3-4B
308 — Automatic Stopper Device
Automatic Stopper Device

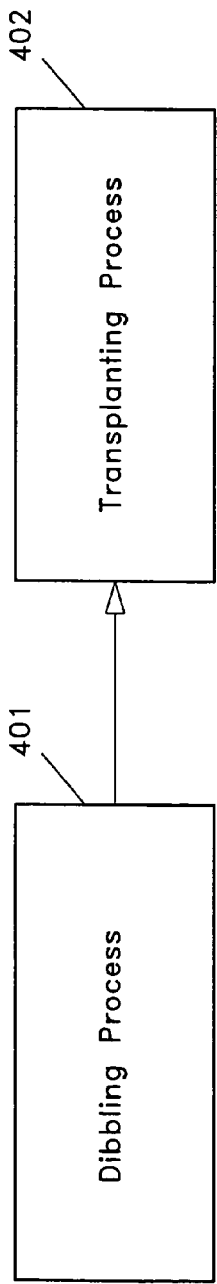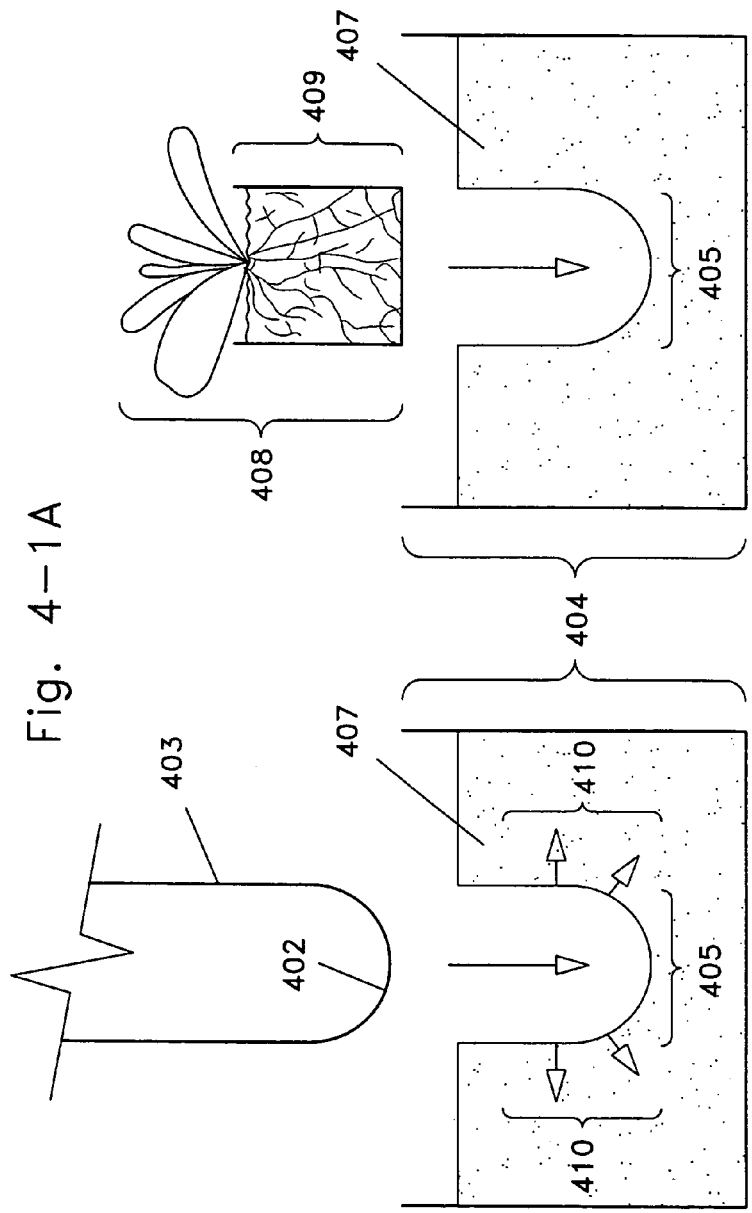
Fig. 4-1A
Fig. 4-1B
Fig. 4-1C

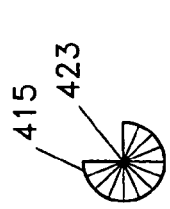
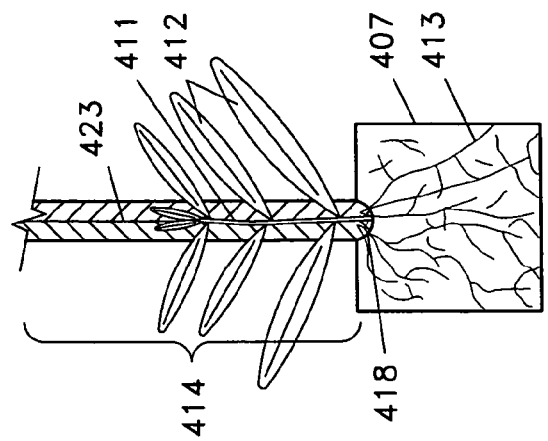
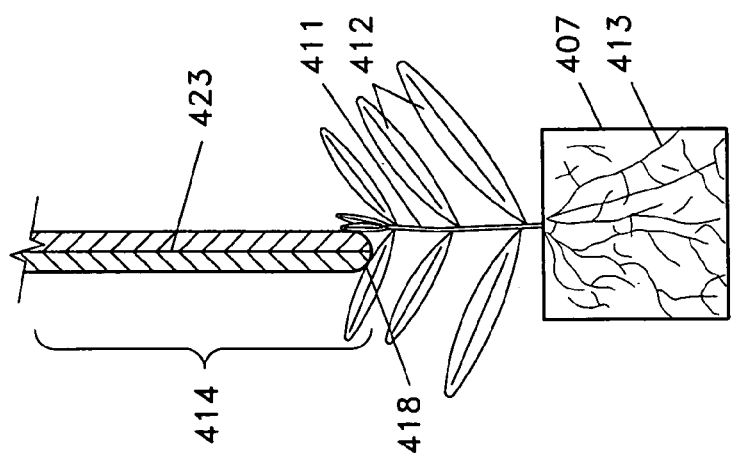
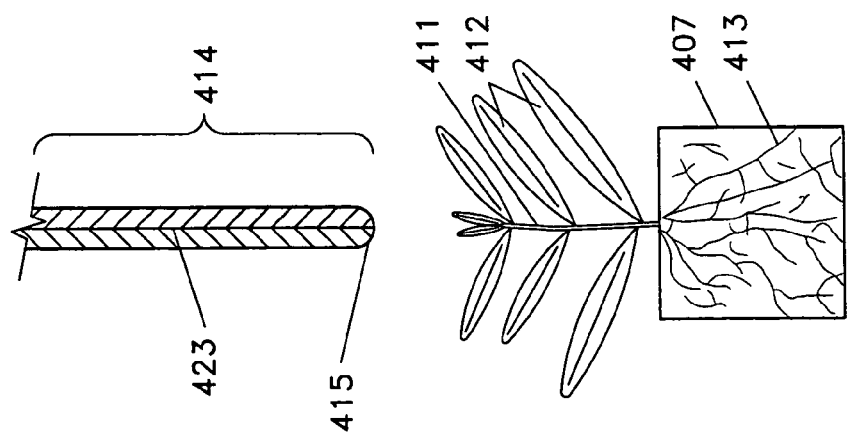
Fig. 4-3A
Fig. 4-3B
Fig. 4-3C
Fig. 4-3D

TRANSPLANT YIELD MAXIMIZATION SYSTEM FOR GROWING PLANTS

I. TECHNICAL FIELD

Generally, this invention relates to a growing system that may incorporate plant production techniques to maximize transplanting yields or provide other enhancements. Specifically, the invention focuses upon techniques and technology for growing plants that when used in combination may result in higher transplanting yields which, in turn, may result in reduced production costs for greenhouse operators where controlling production costs is desirable. These can include processes that improve the transfer of plant seedlings from a high-density tray to a larger/lower density tray, can provide plant transplanting systems which, may be coordinated with requirements of plant seedlings and mechanical transplanters, can provide practical and functional ways in which the size, shape, number and dimensions of a tray and cell in which plant seedlings are initially grown can be coordinated with mechanical transplanters, can provide systems for automatically transplanting plants from small seedling trays to larger containers or trays, and can automate an existing mechanical transplanter so that a number of manual steps may be eliminated and replaced with automatic systems.

II. BACKGROUND

In the production of greenhouse plants from seeds, seeds may be sown into trays with small cells for individual germination. Seedlings are grown in these small cells for a short time before being transplanted into larger (usually finished) containers. Often greenhouse personnel transplant these individual cells by hand into the larger containers. This process is labor intensive and therefore expensive. Since this process of hand transplanting is not economical, several mechanical methods for transplanting the seedlings from the smaller cells to larger containers have been developed. The seedling can be either pulled up and out of the cell and then moved to the larger container or pushed down through the bottom of the cell into the larger container. The present invention focuses on tray designs and systems for transferring the seedling which are particularly appropriate to transfer by pushing it through the bottom of the cell into the larger container.

One type of transplanter that was developed to push the seedling and seedling rooting media through the bottom of the seedling tray into a larger container or tray is noted in U.S. Pat. No. 3,799,078 and U.S. Pat. No. 3,820,480. In these punch-down methods the seedling is punched through the bottom of the seedling tray into the new larger container or tray. These mechanical transplanters improved the efficiency of transplanting labor, but because of the mechanical aspect of the machinery and the like, there has sometimes been a reduction in the yield of seedlings when transplanted into larger containers and within the larger containers. Some seedlings may have been too small or too large to be successfully transplanted using a mechanical transplanter. This may have resulted in greenhouse operators purchasing seedlings that cannot be used, thereby decreasing the yields of finished containers to seedlings. Some seedlings may have been transplanted using this method, but because of mechanical damage to the seedling experienced during the mechanical transplanting process, the seedling later dies. This may result in greenhouse operators replacing the dead plant by hand. This can be very labor intensive and cost inefficient. Sometimes, the greenhouse operator may need to discard the product because it is not salable. This reduces the yield of the expected finished containers. Greenhouse production costs often exceed 70% of the overall product costs. Greenhouse operators need to control these production costs. The best way to do that is to increase yields. Increased yields reduce production expenses by reducing the amount of seedlings required to achieve the planned numbers and by decreasing labor costs due to efficient transplanting and eliminating the need to replace dead seedlings. Increased yields can also result in increased sales because an increased number of salable containers may be available. As production costs (such as fuel and labor) continue to increase, it can become more critical than ever for greenhouse operators to have higher yields to remain competitive in the market. Perhaps surprisingly, however, greenhouse operators have worked to improve seedlings and the transplanting process independent of those designing transfer systems and methods. The growing system in the present invention coordinates the seedling production with the transplanting process to maximize transplanting yields and provide other advantages.

In addition, while the system of pushing or punching the seedling into the new larger container can allow for a simple transfer from the seedling tray to the larger container or tray, a problem can exist in that there may be several steps that need to be accomplished by hand which slows the process down considerably. The punch-down transplanters frequently in use can have as many as 14 to 31 manual steps per seedling tray, depending on the ratio of the larger container or tray to the seedling tray. The slower the process, the more inefficient the use of labor. This can also cause increased production costs.

One problem that greenhouse operators struggle with is that seedling producers have not previously been producing seedlings specifically grown to be transplanted with a mechanical transplanter. In some settings, seedling producers have focused on seedling production for maximum germination, minimum time in the seedling tray and best quality seedling for transportation to the customer who may also do transplanting. On the other hand, transplanter manufacturing companies have historically focused on designing transplanters that transplant the seedlings very fast. The two areas have simply not been as coordinated as they could. For example, one of the problems with this punch-down method of transfer is that the seedling can often be put under pressure as it is punched down through the seedling tray and into the new larger container's media as shown in U.S. Pat. No. 3,799,078 and U.S. Pat. No. 3,820,480. This method uses a very small cell for the seedling, which can result in the transfer of an immature seedling with a small root system in a small amount of rooting media.

Because of the extremely small size of the individual cells, the seedlings can often be damaged during the punch out process. During the punching down process, the plant usually must fit through the opening at the bottom of the individual cell. Because of the high-density number of cells per tray, seedling leaves can be damaged because they do not often fit properly or optimally though the very small cell. This damage to the seedling can provide a wound for disease or insects, which can reduce the vigor of the transplanted plant or even cause death. The seedling can also be punched down through the seedling cell and into the new larger cell's media without a cavity for the seedling's root and media to reside in. The seedling's roots and media may be compressed into the new larger container's media potentially resulting in tearing and crushed roots. Torn and crushed roots allow disease and insects a point of entry, which may reduce seedling vigor and may lead to death of the seedling in the new, larger container.

Further, the amount of rooting media is often extremely small. Because of the small amount of media usually available for the seedling to root into, the root system of the seedling is often small and fragile and therefore subject to tearing or damage that may provide a wound entry for disease or reduce the overall root volume available to support the plant. Healthy roots are critical to high yields after transplanting. Seedlings with damaged, diseased roots usually have reduced vigor and increased mortality rates. All this may require the greenhouse operator to replace the dead plants or discard the container as unsalable. Small, immature seedlings have a higher mortality rate—often as high as a 10–15% value of increase depending on variety of seedling—which can dramatically reduce the transplant yield and increase production costs.

As can be seen, tray designs for the punch-down type of seedling transfer have focused on the method for delivering the seed into the individual cells, on the design of the bottom of each individual cell, and on maximizing the number of individual cells per tray as shown in U.S. Pat. No. 3,903,643, but not on the seedlings themselves. As can be understood, such tray designs did not allow for optimum seedling development. Rather, the focus appears to have been on maximizing the number of individual cells per tray. Perhaps surprisingly, this can actually be detrimental. Because of the very high density of individual cells per tray, it can be extremely difficult to sow an individual seed into each individual cell. The nature of mechanically placing an individual seed in each cell on a tray measuring 10 inches by 20 inches with 1,296 individual cells makes it probable that a large number of cells can be empty. It is even more difficult to insure that the sown seed is placed appropriately.

Obviously, cells without seeds cannot be transplanted. Yet when the tray is used in a mechanical transplanter, the mechanical transplanter does not know that there is no seedling in an individual cell and therefore transplants the empty cell anyway. This requires the greenhouse operator to patch the missing plant by hand, which is again labor intensive and expensive, or to discard the container as not salable—which is also expensive. Seeds not sown into the middle of the cell may become damaged by the mechanical transplanter during the transfer process and seedlings germinating and growing on the edge of the individual cell may be subject to more crowding by neighboring cells and more drying because the roots have less media available. This can cause poor root development and therefore weaker roots. This usually results in a reduced number of transplantable seedlings or in a reduced number of seedlings that will be successful in the larger container. Usually these weak seedlings die or do not perform to the expectations of the greenhouse operator.

Another problem is that because of the extremely high density of the individual cells in the seedling tray, the individual cells are sometimes not able to maximize the germination potential of seeds that are sown correctly. Therefore, the germination yield of the seed can be reduced. To combat the lower germination yield, greenhouse operators are often forced to include a production buffer equal to or greater than the anticipated germination yield. This adds additional expense due to increased use of seed, seedling trays, greenhouse space, and labor and overhead to manage that production buffer.

To compound the situation, the number of individual cells in the seedling tray is not usually coordinated with the number of cells in the larger container. Sometimes the seedling tray and larger container may often not be compatible, resulting in leftover seedlings that may either be thrown away or may need to be manually transplanted. During the transfer process there may be seedlings that are leftover without a finished container in which to be transferred or there may be finished containers without seedlings because the seedlings are used up before the finished containers are done being transplanted. This may require or economically drive greenhouse operators to either discard the left over seedlings or to discard the finished tray that is not completed causing additional expense in seed, growing media, trays, labor, greenhouse space, and overhead to manage product that will be discarded.

Focusing on the punching process itself, the head of the punch-down device can be too large for the cell dimensions. The puncher head may also have a concave face. Often this encourages the seedling to become situated directly under the puncher head. It may thereby significantly increase the likelihood that the puncher head will break or rush leaves and or the stem of the seedling being transplanted. Size or shape may contribute to the punch head hitting the seedling and punching down on top of the seedling. The head of the puncher is often over 50% of the size of the cell thereby assuring that the punch head will come into contact with the seedling's leaf or stem. Crushed or broken leaves or stems may allow disease and insects a point of entry which may reduce seedling vigor and may lead to death of the seedling in the new, larger container.

One specific problem can be that the cell size that the seedling is grown in has not been coordinated with the transplanter to maximize transfer from the small cell into a larger container. This may result in seedling damage because the transplanter cannot successfully transfer the seedling from the small cell-without tearing or smashing of seedling stems or leaves. This tearing or smashing may create a point of entry for disease, or may reduce the vigor of the seedling so it either is stunted or dies in the larger container and thus reduces yield. Another problem is that the root system may be compressed or torn by pushing or pulling on the seedling as it is transferred. This compression or tearing may create a point of entry for disease, reduce the capacity of the rooting media to adequately provide moisture and nutrients and reduce the vigor of the seedling so it either is stunted or dies in the larger container. The ratio of the mechanized transplanter components to the cell size can be critical for transplanting success.

Another problem can be that the maturity of the seedling is often not factored into the transplanting process. Seedling producers know that an immature seedling may not transplant successfully if it has an underdeveloped leaf, stem and root system and that an overly mature seedling may not transplant successfully because it may have an overdeveloped leaf, stem and root system. However, the optimal seedling stage for transplanting based on both cell size and transplanter system has not been considered. The stress of transplanting from small cells to larger containers has not been previously considered which may result in several problems. Seedlings may receive unnoticed damage to leaf, stem and roots that may allow disease to enter and reduce overall plant vigor. The stress of transplanting from the small cell to the larger container is not minimized so the seedling may require a recovery period from transplanting which may then result in increased crop time and additional production costs, therefore, yields can be compromised by seedlings that are not transplanted at the optimum time to better achieve their growth potential whether relative to leaf, stem, or root.

Seedlings are usually grown by large wholesale greenhouses that sell the seedlings to smaller greenhouse operators. The seedlings may be produced in mass quantity without consideration of where the customer for the seedling is located. As a result, one problem may be that a customer in Texas with high light levels and warm temperatures would receive the same cuttings as a customer in Montana with low light levels and cool temperatures. This may create a problem in that the seedlings may not be acclimated to their new environment so transplanting stresses may be increased. This additional transplanting stress may reduce seedling vigor so that diseases may be allowed to increase. Additionally, the vigor of the seedling may be reduced resulting in stunted or dead plants. This, of course, may reduce yields.

Another problem can be that the leaf area and leaf type of the seedling may not be coordinated with the mechanical aspect of the transplanting process. This could result in a significant number of torn or damaged leaves on the seedlings as the transplanter transfers the seedling from the small cell to the larger container. This tearing or damage of the leaf may create a point of entry for disease, or may reduce the vigor of the seedling by reducing the photosynthesis area so it either is stunted or dies in the larger container. This may also reduce yields.

A significant problem also can be that the size of the cell may not be coordinated with the seedling leaf type. Consequently, large leaf seedling varieties may be grown in the same cell size as small leaf seedling varieties. This may cause several problems. Each seedling variety can have a specific leaf size and type based on the genetics of the seedling variety. If a large leaf seedling variety is grown in very small cells, the leaves of the seedlings may overlap or may create a micro environment within the seedling tray. Under these large leaves, humidity may increase and light may decrease. This can be the perfect environment for disease and insects and may cause the seedling to stretch up toward the light causing a weak stem on the seedling. Seedlings with these characteristics may not be successful in the transplanting process. They may die due to the disease or insects that may have already infected them or, because they may have a weak stem, they may break during the transplanting process or fall over once they are transplanted and there is no longer any support from surrounding seedlings to keep them upright. This may also reduce yield. Conversely if a small leaf seedling variety is in too large a cell, the rooting media may dry too quickly because there is not enough leaf area to shade it and evaporation may then be increased. This may result in seedlings that have weakened root systems due to excessive drying which again, may create a point of entry for disease, or reduce the vigor of the seedling so it may become stunted or may die in the larger container.

Another significant problem can be that cell size may not be coordinated with the seedling type to maximize seedling leaf, stem and root development for optimum transplanting yield. Seedlings are often produced in a specific cell size to match the requirements of the mechanical transplanter without consideration of whether that cell size is optimum for producing a seedling that will have a higher potential yield after transplanting. Cell diameter, depth and overall volume is designed for the transplanter, not for the seedling. This may result in seedlings that are stressed because they do not have adequate leaf expansion area and root development area. Seedlings may be susceptible to disease and insects and overall vigor may again be reduced. When transplanting from the small, incorrect cell size to the larger container occurs, the seedling may either be stunted or die in the larger container. Transplanting or increased crop time may be necessary which can add to production costs.

Sometimes, the movement of the seedling tray to the next position in a new larger tray prior to punching down is accomplished as a manual step with the transplant operator required to move the tray into the next position. It can be difficult for the transplant operator to quickly and easily determine where the next position for the seedling tray is. As a result the seedling tray may not be in the correct position so the punch heads can either punch the wrong seedlings or punch in a position that has already been punched, so there are no seedlings in that position to be punched down. Because there are as many as 6 to 14 different positions that the seedling tray needs to be positioned into, the opportunity for operator error is high. This can reduce transplanter efficiency, which increases labor costs.

When the seedling tray is held in place with 2 manual clamps to prevent it from moving up or down during the punch down process. These 2 manual clamps can need to be in position so that the seedling tray does not move which could result in changing the position of the punch heads (as described above) or that seedlings could be damaged due to the punch heads tearing or crushed the seedling tray. This manual step can take additional time for the transplant operator and because the clamps can be small, it can be easy for the transplant operator to apply them incorrectly. Seedlings that are crushed or torn by the punch heads usually die in the large containers.

Yet another problem can be that the larger container (usually a tray) that is positioned below the seedling tray can have a manual stopper. This larger container or tray may need to be positioned in exactly the right place or the seedling that is punched down into it may not be positioned in the center or middle of the new container or tray cell. If the transplanted seedling is not in the center of the new, larger container, the seedling may root out into the new media incorrectly. The roots might be on just one side of the new container. This may reduce seedling vigor and can increase the time it takes to finish the seedling into a salable plant. It is estimated that seedlings not located in the center of a larger container or tray results in 7 to 10 additional days of finished crop time.

III. DISCLOSURE OF INVENTION

The present invention includes a variety of aspects, which may be selected in different combinations based upon the particular application, or needs to be addressed. The invention is a growing system that may maximize plant transplanting yields or provide growth or other advantages through a variety of methods. In one embodiment, the invention is a coordinated plant transplanting system for the seedling tray designed to be coordinated with a punch out mechanical transplanter. From one perspective, the invention may increase the dimensions of the individual cell such as to accommodate the leaves of the seedlings when they are punched through the cell and may prevent damage to the leaves during that process. This increased dimension of the individual cell may also increase the success of sowing the seed into the cell and may allow seeds sown into the cell to be placed in the center of the cell. The increased dimensions of the individual cell may then increase overall germination of the seeds resulting in an increased number of seedlings available for transplant. The invention may also increase the amount of rooting media in each individual cell and therefore may allow for better root development of the seedling or the propagule. The number of individual cells may also be coordinated with the number of finished containers to prevent left over seedlings or containers without plants.

In other embodiments, the invention may be able to factor the maturity of the seedling into the transplanting process which may minimize damage and stress to the seedling during transfer from the small cell to the larger container. The invention may also acclimate the seedling with the new environment that the seedling will experience once it is transplanted. It may coordinate the leaf area and type with the proper cell size which may minimize damage to the leaf during the transfer process from the cell to the larger container. It may coordinate the cell size with the seedling type for maximum leaf, stem and root development so the seedling may be best developed to go through the transplanting process. It may also eliminate the compression of the roots and rooting media of the seedling as it is placed into the media of the larger container or tray. A cavity can be created and may be referred to as a "dibbled" hole or as the act of "dibbling".

One objective of the invention may be to increase transplanting yields or growth speed such as by reducing damage to the seedling stem and leaves and to the seedling root system. This can be accomplished by coordinating the cell size with the seedling transplanter and perhaps the species involved. To accomplish this, the cell size may be coordinated with the mechanical transplanter to prevent the act of mechanically transferring the seedling from the small cell into the larger container from tearing or smashing the leaf and stem and may also prevent the compressing and tearing of the seedling roots as the seedling is transferred from the small cell to the larger container. The correct ratio of the mechanized parts of the transplanter to the specific cell size may be used to prevent this damage.

Another goal of the invention may be to increase transplanting yields by factoring the correct maturity of the seedling to maximize the vigor and health of the seedling before, during and after transplanting. Transplanting stress on the seedling could therefore be reduced by transplanting the seedling at the correct stage of development.

Another objective may be to increase transplanting yields by acclimating the seedling to the type of environment that the seedling will receive once it has been transplanted from the small cell to the larger container. Factors such as geography and time of year may be used to determine the growth of the seedling. This may prevent or at least reduce stress on the seedling during and after the transplanting process.

Another goal of the invention may be to coordinate the seedling leaf area with the mechanical transplanting process. By using a combination of light, fertilizers, water and temperature, among other factors, the leaf area of the seedlings can be sized correctly to maximize plant health and minimize damage during the mechanical transfer from the small cell to the larger container. This may be done for each seedling variety which could then result in a consistently high number of high quality seedlings available for transplanting. This process may increase transplanting yields.

A goal of the invention may be to coordinate the seedling leaf size and type with the small cell size. This could allow the seedling to have maximum vigor for transplanting. The transplantable seedlings within the seedling trays may increase and the number of stunted or dead plants in the transplanted larger containers will decrease. This process may also increase transplant yields.

A significant goal of the invention may also be to coordinate the seedling variety with the overall cell size and the mechanical transplanter which may increase yields. By maximizing the vigor and health of the seedling through optimum leaf, stem and root development in the small cell, the seedling may have higher yields in the larger containers. The exact requirements of each seedling variety plus the mechanical actions of the transplanter may be part of the overall growth requirements for the seedling and may be factored into a tailored system.

Naturally further objects of the invention are disclosed throughout other areas of the specification and claims.

IV. BRIEF DESCRIPTION OF THE DRAWINGS

FIG. 1-1 shows the coordination between the seedling cell size and the mechanical transplanter requirements that may result in increased transplant yields.

FIG. 1-2A-B shows the relationship between the seedling maturity level and the mechanical transplanter requirements that may result in increased transplant yields. FIG. 1-2A shows the complex interaction between the environment and optimum seedling maturity. FIG. 1-2B shows how optimum seedling maturity coupled with mechanical transplanter requirements may result in increased transplant yields.

FIG. 1-3 shows the effect of the seedling environment as determined by the transplanted seedling environment which may result in increased transplant yields.

FIGS. 1-4A–C shows the relationship between the leaf size and type and the mechanical transplanter requirements. FIG. 1-4A shows the relationship of leaf size to the individual cell before transplant. FIG. 1-4B shows the relationship of leaf type to the individual cell before transplant. FIG. 1-4C shows the relationship between leaf size and type with the requirements of the mechanical transplanter which may result in increased transplant yields.

FIG. 1-5A-B shows the relationship between optimum seedling development and mechanical transplanter requirements. FIG. 1-5A shows a cross section of optimum development of a seedling. FIG. 1-5B shows the relationship of the key components of seedling growth with the requirements of the mechanical transplanter which may result in increased transplant yields.

FIGS. 2-1A–D show in cross section how the larger cell dimension will allow the seedling leaves to fold toward the center of the cell during the extraction process without excessive folding and therefore damage to the leaves.

FIG. 2-1B shows the seedling root media one half extracted from the individual cell and the position of the leaves.

FIG. 2-1C shows the root media just after extraction from the individual cell and the position of the leaves.

FIG. 2-1D shows the seedling fully extracted from the cell and the leaves returned to their pre-extraction position.

Figure 1:
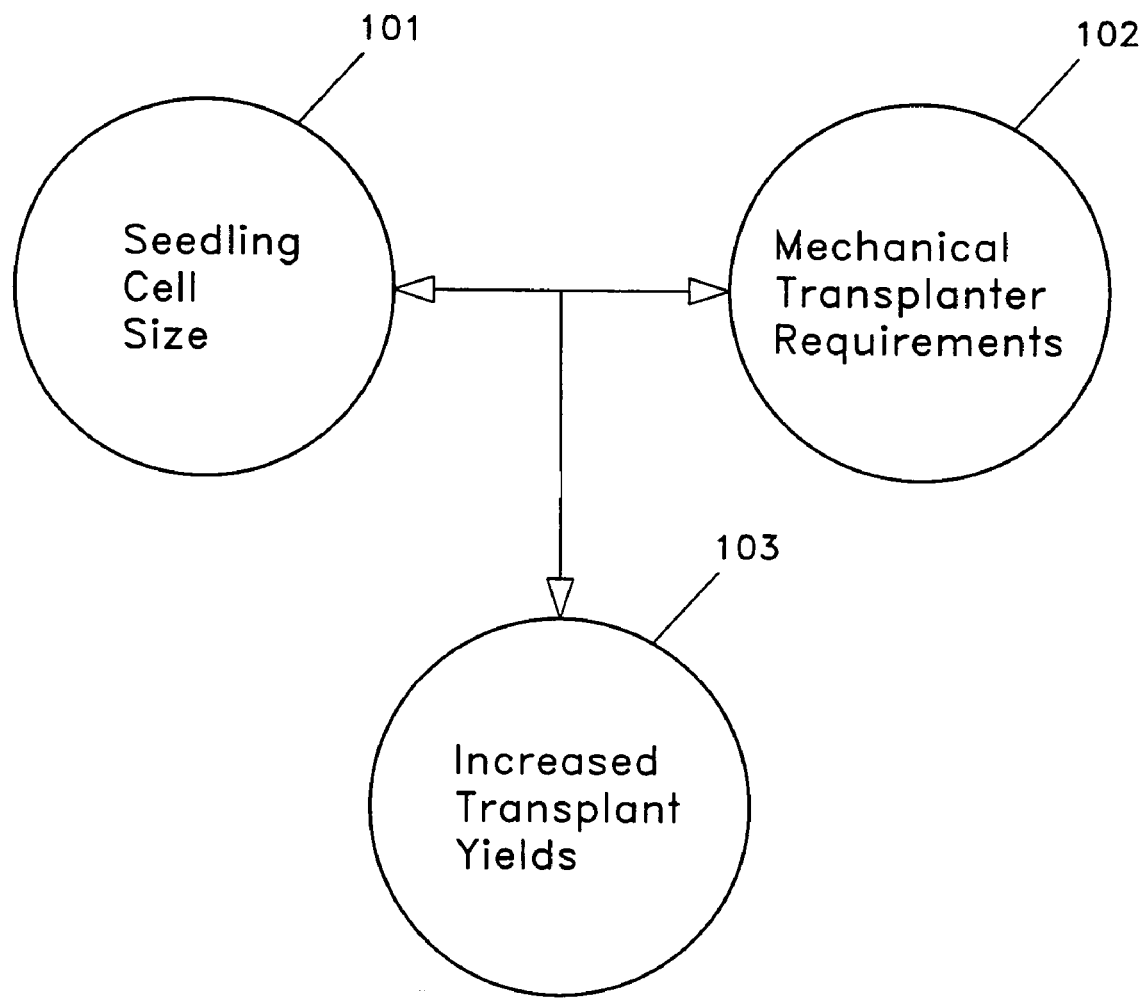
Figures 1, 2, 2A, 2B:
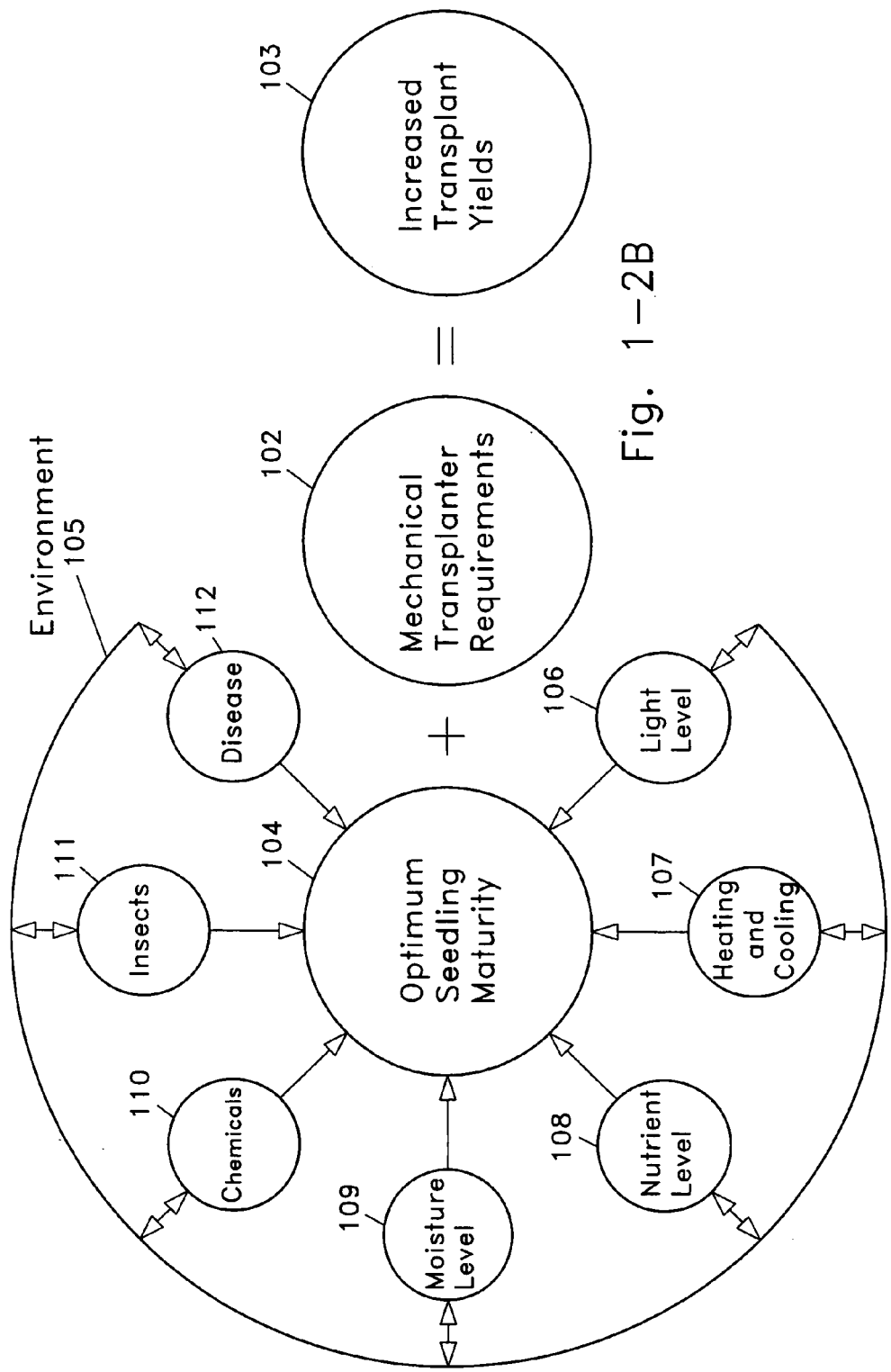
FIG. 2-1A shows the seedling prior to beginning the extraction process.

FIGS. 2-2A–D show the improvement of larger cell dimension on the ability to increase the number of successfully sown seeds per seedling tray and the improved seed placement in the middle of the individual cells.

FIG. 2-2A shows a cut-away section of the tray with a transplanter wheel next to it. This shows the reduced number of pick-up holes per transplanter wheel resulting in better seed pick-up and therefore increased seed sown. The wheel type transplanter is shown as an example of merely one of many different types of transplanters. The theory of seed pick-up to seed sown can be similar regardless of transplanter type.

FIG. 2-2B shows the improved seed placement in the center of each individual tray.

FIG. 2-2C shows a top view of the seedling in the center of an individual cell and the healthy leaf development due to reduced crowding from neighboring cells.

FIG. 2-2D shows a cross section of the seedling in the center of an individual cell and the healthy root system due to more even drying of the media for the root area.

Figures 1, 2, 3:
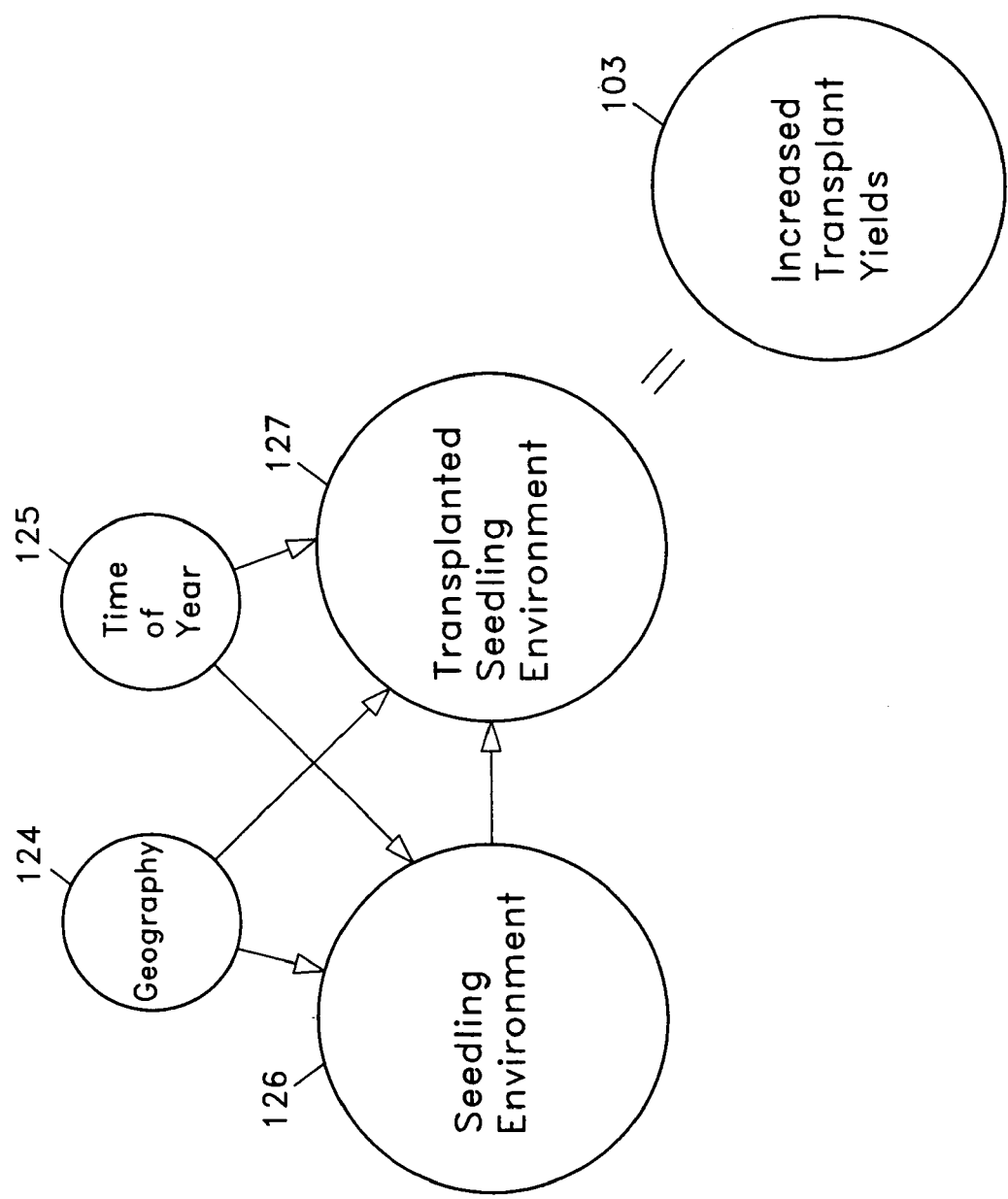

FIG. 2-3 shows a relationship of increased cell dimensions to lower seedling density to increased germination yields to increased transplantable seedlings to increased transplant yields.

FIGS. 2-4A–B show the increase in maturity of the roots and the seedling with increased root media.

FIG. 2-4A shows a small root media and the maturity of the seedling.

FIG. 2-4B shows a larger root media allowing for more complete root development and seedling maturity prior to transplanting.

FIGS. 2-5A–B show the relationship between the number of individual cells in the seedling tray with the number of cells in the larger container.

FIG. 2-5A shows that a seedling tray or trays can do multiple larger container trays.

FIG. 2-5B shows that the seedling tray or trays individual cell number divided by the larger container cell number is an even number without any decimals.

FIG. 2-6 schematically shows the transplanter transplanting seedlings from 2 seedling trays into multiple larger container trays. The number of seedling trays transplanted at 1 time may be determined by the multiple of the larger container trays.

FIG. 3-A-B shows the relationship between reducing the number of manual steps from 14 to 31 down to just 2 manual steps.

Figures 1A, 2:
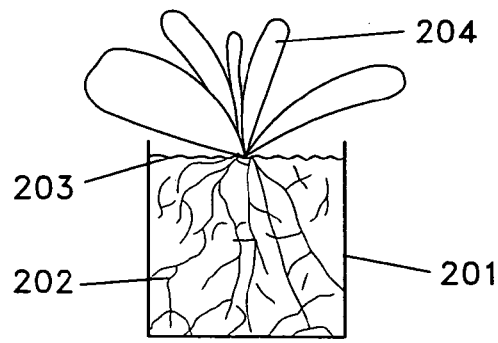

FIG. 3-1A shows the reduction of 14 to 31 manual steps.

Figures 1B, 2:
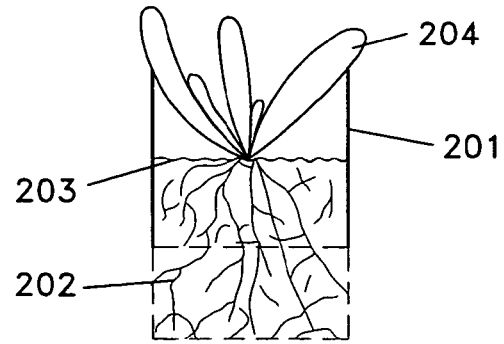

FIG. 3-1B shows the benefit of the reduction to just 2 manual steps. The result may be reduced labor, increased transplant efficiency and reduced operator errors.

FIG. 3-2A-B shows an automatic moving device for the seedling tray.

FIG. 3-2A is a cross section of the punch down transplant system showing the punch heads positioned above the seedling tray with an automatic moving device and the larger container or tray beneath.

FIG. 3-2B shows the seedling tray with an automatic moving device and the range of movement required.

FIG. 3-3A-B shows the automatic clamp device for the seedling tray.

FIG. 3-3A is an overhead view of the seedling tray and an automatic clamp device.

FIG. 3-3B is a cross section of a punch down transplant system showing the punch heads positioned above the seedling tray with an automatic clamp device and the larger container or tray beneath.

Figures 1, 2, 3, 4, 4A:
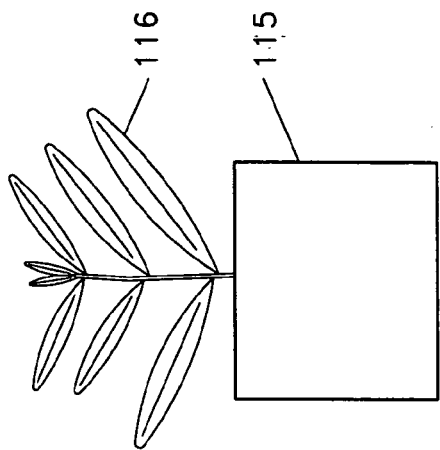

FIG. 3-4A-B shows the automatic stopper device for the seedling tray.

FIG. 3-4A is a cross section of the punch down transplant system showing the punch heads positioned above the seedling tray with an automatic stopper device and the larger container or tray underneath.

Figures 1, 2, 3, 4, 4B:
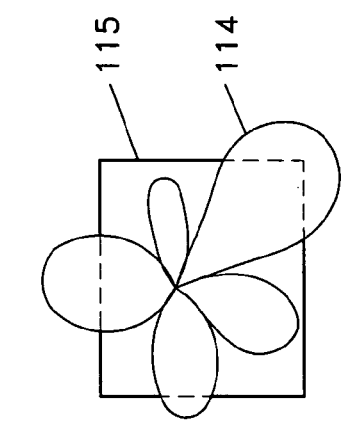
Figures 1, 2, 3, 4, 4C:
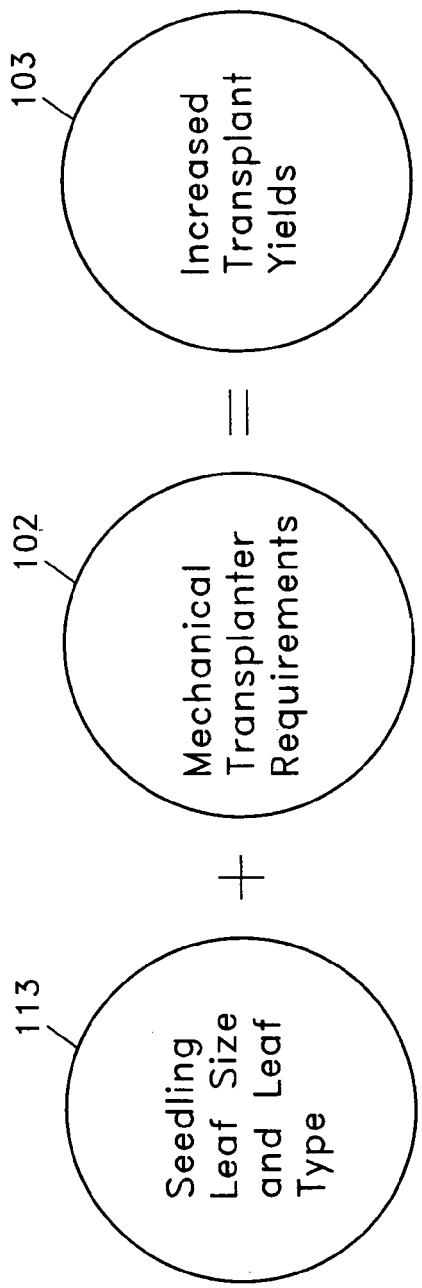

FIG. 3-4B is an enlarged view of the seedling tray properly positioned directly above the middle of a larger container or tray by an automatic stopper device.

FIGS. 4-1A–C show the dibbling process and transplanting of the seedling into the predibbled hole.

FIG. 4-1A shows the dibbling process prior to the transplanting process.

FIG. 4-1B shows a cross section of the hole being dibbled and the shape of the dibbling mechanism.

Figures 1C, 2:
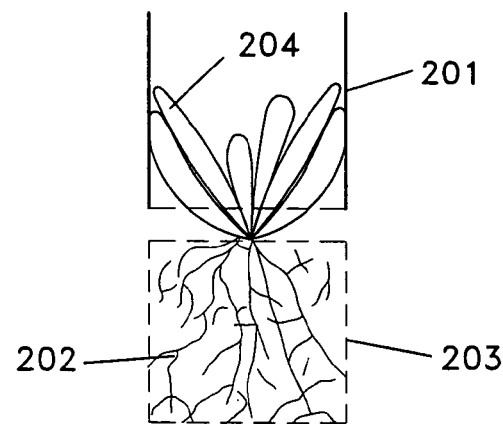

FIG. 4-1C shows a cross section of the seedling being transplanted into the predibbled hole.

FIGS. 4-2A–B show the ratio of the punch head to the cell dimensions.

FIG. 4-2A shows this ratio in profile.

FIG. 4-2B shows this ratio from the perspective of above the punch head looking down on the cell dimensions.

FIGS. 4-3A–D show the location of the seedling in the seedling cell and how the punch head may descends on the seedling cell without damaging the seedling.

FIG. 4-3A shows an overhead of the punch head on the seedling cell with the seedling located in a particular quadrant of the seedling cell.

FIGS. 4-3B and 4-3C show the punch head descending on the seedling cell and the seedling located in the nook of the kidney shaped punch head. The seedling may not be in contact with the punch head as the punch head descends onto the seedling cell.

FIG. 4-3D shows a design of the punch head in cross section.

FIGS. 4-4A–B conceptually show the transplanter transplanting seedlings from two seedling trays into multiple larger container trays. The number of seedling trays transplanted at one time may be determined by the multiple of the larger container trays. This may even show an improvement in efficiency of two or three times.

Figures 1, 2, 3, 4, 5, 5A:
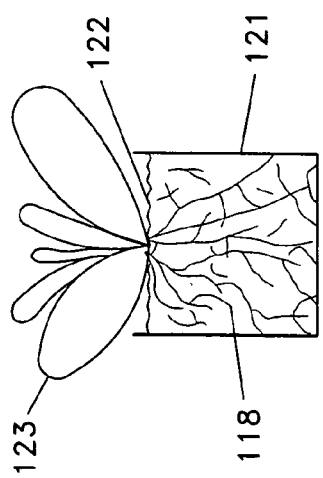
Figures 1, 2, 3, 4, 5, 5B:
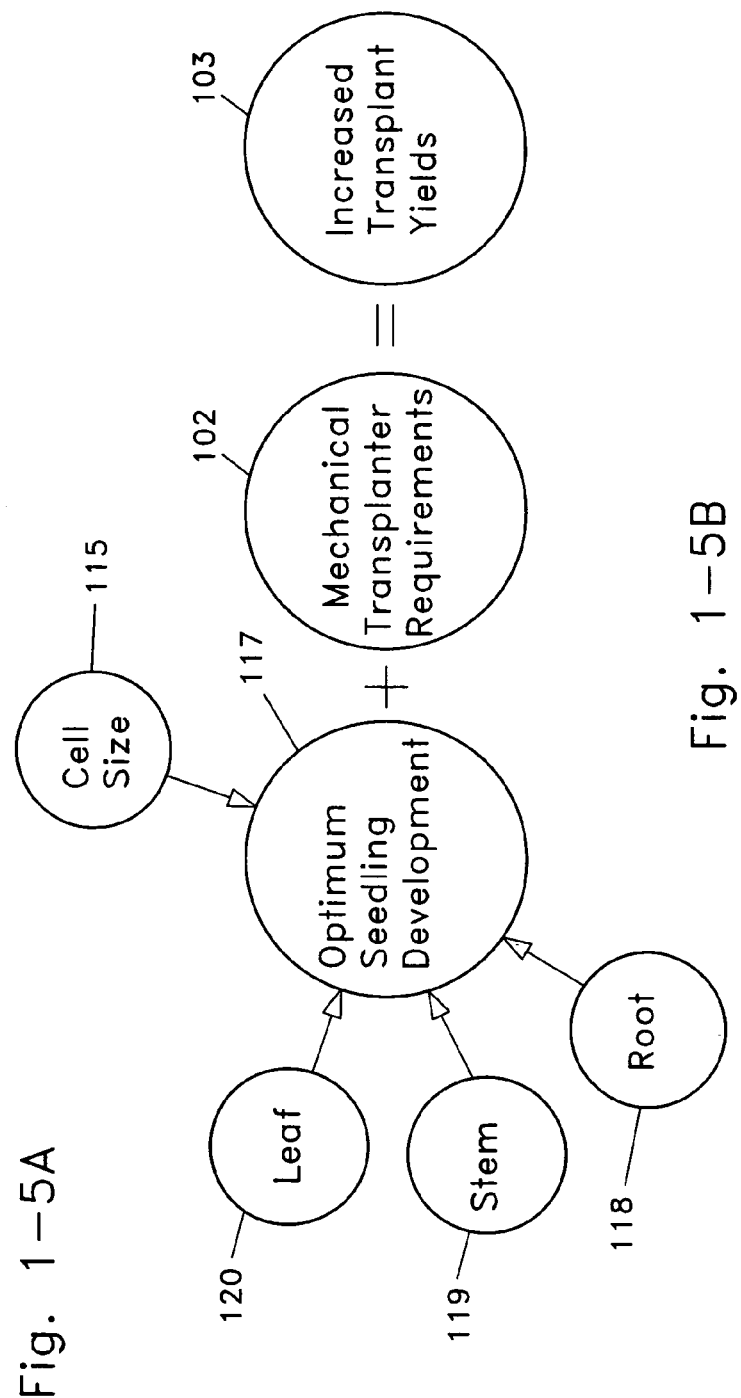

FIG. 4-5 shows conceptual relationships similar to those in FIGS. 4-4A–B.

FIG. 5-1 shows one type of transplant system.

V. MODE(S) FOR CARRYING OUT THE INVENTION

As mentioned earlier, the present invention includes a variety of aspects, which may be combined in different ways. Each of these aspects may at times be discussed separately or at times as combined with other aspects in no particular order. It should be understood that all permutations and combinations are possible for any given system.

As shown in FIG. 1-1, the invention may involve the coordination of the seedling cell size (1) to the mechanical transplanter requirements (2). Although described in the context of—and initially intended for application to—a punch down type of transplant system, it is not necessarily limited to that type of transplantation. As shown in FIG. 5-1, however, it can be understood how such a system is used. Basically, when it is desired to cultivate or grow plants in the commercial quantities of a green house setting, one determines the species (501) to be grown and then proceeds to plant the species. This can occur by planting seeds, of course. This usually occurs in trays (502) containing separate propagule transplant containers (503) arranged in a repeatable pattern or matrix (504). The containers (503) may have placed within them an appropriate growth media (505). By utilizing a controlled environment, these propagules are then nurtured to an appropriate development in a stage referred to as an initial growth stage.

Since the propagules are planted perhaps in a first matrix, it may be deemed appropriate to transfer the given plant species (501) to a larger container, often using a given transplant modality. In a punch down system, this is usually accomplished by using a plant punch element (507) to act upon an intermingled plant-media mass (506). The plant punch element (507) thus causes a substantial portion—if not all—of the intermingled plant-media mass (506) to be extruded from the propagule transplant container (503) through a yieldable exit element (508) or the bottom of each container. By permitting the plant punch element (507) to have movement within or even through the matrix (504), the extruded intermingled plant-media mass (506) may be placed in an adolescent plant container (509). This can occur because most intermingled plant-media masses (506) are cohesive and thus present an individual transplant cohesive intermingled plant mass. Of course the matrix may also be arranged in a rectilinear matrix of orderly rows and columns. Since the trays used are intended for greenhouse use, they are usually adapted for use in a controlled growth environment such that they can be moved, watered, subjected to growth substances, and the like.

In one modality, it is also possible that in both extruding and inserting the plant, this action can occur continuately, that is, as part of a single step which both pushes the plant propagule out and as part of the same uninterrupted motion pushes it into the new container. Thus, the system may be arranged as a continuate insert system (510). This may occur immediately after extruding the propagule. It may even occur very close to each other and so the system may provide for close tolerance positioning of the two trays. Multiples of the extrusion and insertion processes for a plurality of plant propagules can occur at once and even simultaneously for even more efficiency.

By dibbling the larger container (509) or tray prior to the larger container or tray receiving the transferred seedling or more generally, propagule, the transferred seedling can have a space available for the seedling's roots and rooting media. This can be especially important as the size of the seedling being transferred is increased to allow for a more mature seedling in leaves, stem and root development to be transplanted. With a larger root system and more rooting media to allow the seedling to mature more in the seedling tray, the larger tray media can require a dibbled hole to receive the seedling or the seedling's root system would usually be crushed and torn to some degree. By having a predibbled hole that is coordinated with the size of the seedling root system and rooting media being transferred, the seedling can be able to be punched into the new larger container or tray without damage to the root system due to compaction which can result in crushing or tearing of the roots.

The shape of the dibbling mechanism or predibbler (511) can even be convex and blunt. This may allow the larger cell media to be pushed to the side as the hole is dibbled rather than it being compressed or compacted by the dibbling mechanism. This predibbled hole can provide a better surface area for assimilation between the seedling rooting media and the new larger container root media.

As shown in FIGS. 4-1A to 4-1C, each individual larger cell can be predibbled prior to the transfer of the seedling into the new larger cell. The dibbling process (401) may occur prior to the transplanting process (402). The dibbling mechanism or predibbler (403) may be positioned above each large cell (404) and lowered into the media (407). The size of the dibbling mechanism (403) could correspond to the size of the seedling rooting media (409). Thus the predibbled hole (405) may be the correct size to receive the seedling rooting media (409). The shape of the dibbling mechanism (403) could have a blunt convex shape (406) at the end that penetrates or acts upon the media (407). This shape may move the media (407) sideways (410) preventing or reducing compression or compaction of the media (407). The seedling or propagule (408) may fit directly into the predibbled hole (405) allowing for best assimilation of the seedling rooting media (409) with the large cell (404) media (407). The number of dibbling mechanisms (403) could match the number of large cells (404) per large container or row.

FIGS. 4-2A to 4-2B show the ratio of the dibbling mechanism (403) to the media (407). The optimum ratio may fall between 30% and 10% of the media dimensions. This may provide the amount of dibbling mechanism (403) required to punch the seedling through the seedling tray into the new larger container. The media may be held intact by the root system of the seedling and because the dibbling mechanism (403) is large enough to cover a sufficient amount of media (407) to easily extract the seedling from the seedling tray.

One aspect of an operational system for transplanting growing plants that increases transplant yield by reducing damage to seedling leaves, stems and roots during the transfer process is thus presented. This can be accomplished by predibbling a hole for the seedling to rest in after the transplanting process with a blunt convex shape, which can move the media to create a hole without compacting the media. This same or a similar blunt convex shape can be used on the punch head face to gently move the seedling to the side as the punch head descends and extracts the seedling from the seedling cell.

At the time of transplanting, the propagule can perhaps be considered a juvenile plantlet which is about to begin a second growth phase. Again this may be in a controlled environment. As this phase is accomplished, the plant may become an adolescent plant. Of course, in keeping with the broad nature of the invention, it should be understood that the terms juvenile and propagule and adolescent may be considered to encompass even fully grown plants for certain desired applications.

As mentioned earlier, an important aspect of the invention is to provide an enhanced yield. This is considered in the context of the yields traditionally available for each species and each transplant modality. This traditional transplant production yield of course may vary by species but importantly, enhancements over the traditional yield for a particular species are what is desired. This can be accomplished by determining and impacting the growth by a punch-transplant-specific morphological growth criterion or perhaps a punch-transplant-optimized morphological growth criterion. In each case, the criterion is specifically selected and determined as being appropriate for the particular transplant modality intended to be used. The entire system or specific components can be designed so that it or they are supportive elements for such a criterion. Thus an aspect of the system, such as a container size or the like, may serve as a supportive element which assures the proper criterion.

Again, in designing such a system, it should be understood that all the values applied may be further varied to coordinate to a particular species and to particular customer needs. A key aspect, however, is the possibility of now coordinating the physical aspects of the tray or the growing system with the requirements of the larger containers that the seedlings will be transplanted into, while taking into consideration the requirements of the seedling or species before, during and after transplanting and the mechanical characteristics of the transplanter.

One feature which can be applied is that of using an externally manifested growth criterion. As such, the feature is not one such as age that needs to be guessed at, but rather one that can be determined with certainty. This can aid in use of the system since processes with large numbers of events, such as presented here, can require statistical analysis for ultimate assessment. To avoid a need for guessing or to at least minimize uncertainty, an externally manifested criterion can be used. When selected for a specific transplant modality or the like, the criterion can be said to provide a punch-transplant-specific morphological growth criterion. The particular criterion selected may even be one which has been determined (statistically, through experimentation, by application of theory, or even through estimation) to be a yield sensitive criterion.

As one of ordinary skill in the art of plant cultivation would readily appreciate, any possible criterion could be applied. These criterion may even vary by species or transplant modality utilized. For example, but without limitation, the criterion could include the transplant environment utilized, the transplant procedures utilized, the transplant device utilized, the seedling environment utilized, or the like. Importantly, any one or any combination of any of these can be selected and varied in order to achieve an enhanced production yield over that traditionally experienced. This enhanced yield may even be statistically increased by merely affirmatively establishing the criterion and then accomplishing the transplant event at a time when that criterion is substantially established.

As mentioned the morphological growth criterion selected may be one or more of a variety of factors. When multiple factors are used to achieve the enhanced yield or the like, the system may be said to have involved multifactorial criterion. Thus, by utilizing multifactorial punch-transplant-specific morphological growth criterion or the like, the system can provide the desired advantages. Each or any one of these criterion may of course be appropriate to a given plant species and a given transplant modality and it can be the coordination of these two previously unrelated aspects that can be significant. Further, as examples are given throughout this description, it should be understood that any example or value may be specifically applied to any species. The following species or groups may also be specified throughout, including but not limited to: bedding plants, cut flowers, vegetative cuttings, petunias, pansies, snapdragons, vincas, lobelias, portulacas, geraniums, bacopas, helichrysms, impatiens, and even new guinea impatiens, to name a few. As yet another example, it should be noted that a simple ratio involving any of the foregoing or other factors may be applied as well as all combinations and permutations of any factors identified.

By coordinating at least one transplant system aspect with at least one externally manifested criterion, the invention can provide the advantages desired. The transplant system aspects may be as simple as a consideration of the specific mechanical actions of the transplant system with a concurrent consideration of the stage of development for transplant. As yet another example, by relating a transplant system dimension to a propagule transplant container size value, enhancements can be realized. Instead of merely considering the age of the plant for when it would outgrow the initial propagule transplant container, the invention can consider the age for optimal transplant and thus it can provide for optimizing the average development stage for a particular transplant system or modality. As to terms used, it should be noted that as used throughout this description, the term "optimal" "maximized" or the like is not intended to be only limited to the best in any situation. It is sufficient that the relevant feature or result only be enhanced over traditional methods whether or not the best is achieved. The factors relevant to optimal age can be varied, of course. They may include punch head size or type, container size, or the like. The average development stage may even be selected to precisely establish a specific-tray optimized morphological growth criterion and may be coordinated with a particular matrix intended to be used. It may also provide an automatic transplant system aspect coordination element when applied in a system in which transplantation is accomplished through a system which is automated and designed to operate with less human intervention.

In systems in which it is desired to achieve a punch-transplant-optimized morphological growth criterion, the system may include components or the like to serve as supportive elements to such a criterion, that is to provide an element which makes it more likely that the desired criterion will actually be achieved on a substantial number of propagules. One factor which can be selected here is that of providing for an enhanced growth speed of the plant. This is possible because with the new system, transplantation can be accomplished as a stage or in a system which provides for a particularly desired criterion. As another example, it can be seen that by providing for transplant at an age of about 7, 5, or even 3 days premature as compared to a traditional transplant age for the particular species involved, the juvenile plantlet, or adolescent plant may even grow at a faster pace than previously experienced in traditional transplant trays or the like. Importantly, through the present invention, it is now possible to provide a more wholistic system and to thus achieve the commercial advantages desired. Again, even in a growth speed context it should be understood that multifactorial criterion can be applied. As such multifactorial punch-transplant-optimized morphological growth criterion can be affirmatively established in a manner such as to provide a growth speed enhancement element or the like.

As mentioned earlier, the goal of one embodiment is to achieve a yield enhancement or even a yield maximization effect, that is a result which is statistically increased over a transplant production yield traditionally experienced for a particular species and a particular transplant modality. This may be a yield of greater than about an eighty-five percent, ninety percent, or even ninety-five percent production yield. One way this can be accomplished is through use of a subdued density matrix, that is a matrix of plant containers which are spread out over a larger area than traditionally used. It may even be a rarefied density, that is a substantially lower density of containers than used for a particular species.

Especially appropriate to the invention is using a system which provides for simultaneous transplantation of a plurality of plants at once. This may include simultaneously extruding (such as through a simultaneous extrusion system) and/or simultaneously inserting (such as through a simultaneous insertion system), each as illustrated in one embodiment in FIG. 5-1. All this may be accomplished through an automatic transplant system, of course.

As mentioned earlier, one goal of an embodiment is to reduce the overall manual steps that are currently required to run a punch-down transplanter. By automating specific manual steps in the transplanting process, the number of manual steps can be reduced to even 2 manual steps from the current 14 to 31 steps. Another goal of an embodiment is to reduce the number of operator errors during the transplanting process. This is consistent with the reduction in current manual steps from 14 to 31 steps to as little as two steps. This may reduce operator error to near zero, which may then increase transplanter efficiency and reduce production costs.

It may also increase the efficiency of the transplanter. It is estimated that the efficiency could increase by 35% due to the reduction in manual steps and the like.

Another objective of an embodiment of the invention is to provide for the automation of the movement of the seedling tray as it is repositioned for the punch heads. The seedling tray may begin in the start position and may then automatically move to the next position based on a mechanical device that could be activated when the transplant operator moves the punch heads. This could eliminate 6 to 14 manual steps per seedling tray and may increase transplant efficiency and reduce production costs. FIG. 3-1A to 3-1B shows the aspect of the impact of reducing the number of manual steps from perhaps anywhere from 14 to 31 (301). The number of manual steps actually reduced may vary based on the number of individual cells in the seedling tray being transplanted. The larger the number of individual cells in the seedling tray, the larger the number of manual steps there are to be reduced. When 14 to 31 manual steps (301) are reduced to 2 manual steps (302) there may be a significant reduction in production costs (306). Production costs (306) that may be most affected include: reduced labor (303), increased transplant efficiency (304) and reduced operator error (305). Reduced labor (303) may allow the greenhouse operator to reallocate the labor resources or reduce overall labor. Increased transplant efficiency (304) means that the number of trays able to be transplanted per hour may be increased by up to about an estimated 35%. The result may be a reduction in labor. Reduced operator errors (305) may eliminate the amount of wasted motion due to not positioning the tray in the correct position. It may reduce damage to seedlings due to incorrectly punched seedlings. This may result in more viable seedlings in the larger containers or trays and increased transplant yields.

Another objective is to move the seedling tray (307) with an automatic moving device (308) as shown in FIGS. 2-2A to 2-2B. The punch head assembly can have the same number of punch heads (310) as the larger container or tray (311). This means the punch head assembly (309) can have fewer punch heads (310) than the seedling tray (307) has individual cells (312). The seedling tray (307) could then be moved by the automatic moving device (308) after each punch action in order to position the punch head assembly (309) above a new set of individual cells (312). The motion (313) of the seedling tray (307) by the automatic moving device can be both forward to backward and side to side. This may allow for every individual cell (312) to be positioned under the punch head assembly (309) correctly for transfer into the larger container or tray (311).

The combination of the reduction of all the manual steps may increase the efficiency of the transplanting process by as much as 35%. Greenhouse operators may be able to transfer this efficiency in the form of labor to reduce overall payroll or reallocate for other projects within the greenhouse operation. There may be a further increase in transplant yield, which may further reduce production costs and add to the bottom line.

Another objective of the invention is to provide for automatically clamping the seedling tray to keep it from moving during the punch-down process. The seedling tray may automatically be clamped each time the transplant operator moves the punch heads. This may eliminate 2 steps per seedling tray and importantly may also insure that the tray is properly positioned to eliminate smashing or tearing of the seedlings by the punch heads because the seedling tray is not clamped into the correct position. This may prevent additional production costs due to replacing dead seedlings or discarding the container as unsalable.

Another objective of yet another embodiment of the invention is to automatically position the new larger container or tray under the seedling tray. The new larger container or tray may have a stopper that could automatically engage as the transplant operator moves the punch heads up from the transfer process. This may eliminate 6 to 14 steps per seedling tray resulting in increased transplant efficiency and reduced production costs. This aspect may also insure that the seedlings being transplanted will be positioned in the middle of the new container or tray. This may insure proper seedling growth and may increase seedling vigor and improve finished crop time by 7 to 10 days.

FIGS. 3-3A to 3-3B shows an automatic clamp device (314) next to the seedling tray (307). The automatic clamp device (315) may automatically clamp the seedling tray (307) prior to starting the punch down process. The automatic clamp device (315) may then engage prior to the punch head assembly (309) descending to the seedling tray (307) and punch the seedlings through to the larger container or tray (311) underneath. This may prevent the seedling tray (307) from moving when the punchheads (310) engage the seedlings (314). The result may be increased accuracy in the punching process preventing damage to seedlings (314) in the larger container or tray (311).

Another objective shown in FIG. 3-4A to 3-4B is an automatic stopper device (316). The automatic stopper device (316) may engage as each larger container or tray (311) is put into position below the seedling tray (307). The automatic stopper device (316) may also insure that the larger container or tray (311) is positioned correctly to receive the seedlings (314) as they are punched through the seedling tray (307). This may result in the large container or tray individual cell (317) being positioned exactly in the center of the seedling tray (307) individual cell (312). The seedling (314) may then be punched into the center of the larger container or tray individual cell (317), which may increase viability of the transplanted seedling. This may result in increased transplant yields and decreased production costs. It may also reduce the number of manual steps by 6 to 14.

As can be appreciated, the automation of the various movements necessary can be accomplished to any degree. Referring to FIG. 5-1, it can be seen that the frame element (512) of the system such as the base or adjoining elements can provide or be attached to a specific set of guides which provide for positioning of the various trays involved. For example, a propagule transplant container matrix guide (513) can provide for the top tray to be positioned so that at least some portion of it is parallel to an adolescent plant container matrix guide (514). It may even be positioned substantially orthogonal to an orthogonal plant punch support (515). The system may include a movement mechanism (516) which may act upon the punch elements (507). Importantly an automated movement sequencer (517) may act upon one or more of the various trays. This may act as an automated forward tray movement sequencer or as an automated side-to-side tray movement sequencer such as to coordinate the punching of all containers into the larger tray. In operation the system could create a sequence of automated movements to appropriately reduce the manual steps involved.

One aspect mentioned earlier is the fact that the system can be designed to provide for a close tolerance adolescent plant container matrix guide as shown. In this type of an embodiment, the system may have the adolescent plant container situated as close as possible to the propagule transplant container so that at the time of transplanting the two are situated in close proximity and parallel to at least a portion of each other. This can minimize the exposure of the plant to disease and the like and can thus serve to enhance yield or achieve other desired effects.

As mentioned earlier, and as shown in FIGS. 1-1, 1-5A, and 1-5B, the seedling cell size (101) may need to match the mechanical transplanter requirements (102) to get increased transplant yields (103) or the like. Mechanical transplanter requirements (102) can vary with the machine selected, and coordinating the seedling cell size (101) with the mechanical transplanter requirements (102) or the mechanical transplanter requirements (102) with the seedling cell size (101) may become critical to increase transplant yields (103). This matching of factors can include providing a particular species to propagule transplant container size ratio, a particular species coordinated propagule transplant container size, or it may even provide a season particularized transplant coordinated propagule transplant container size. The propagule transplant container size utilized may have a container dimension value which serves as a criterion establishment element.

One objective of the present invention may be to increase the overall dimensions of the individual cell to accomplish the aforementioned and other goals. As mentioned earlier, a first goal may be to prevent damage to seedling leaves as they pass through the cell into the larger container. The next goal may be to make a larger surface area for the seed to be sown onto to increase the germination yield. Yet another goal with the larger surface area may be to make it more likely that the seed will be sown into the center of the individual cell so the seedlings have more vigor and will not be damaged during the transfer process of the mechanical transplanter. By increasing the overall dimensions of the individual cell, the germination yield of the seedling tray may increase because of a lower overall seedling density in the seedling tray. This may also increase germination yields and therefore increase transplantable seedlings. By increasing overall individual cell dimensions, the seedling may then be able to be in the germination tray longer so that the seedling may be more mature at transplant thereby increasing transplant yield.

Figures 1D, 2:
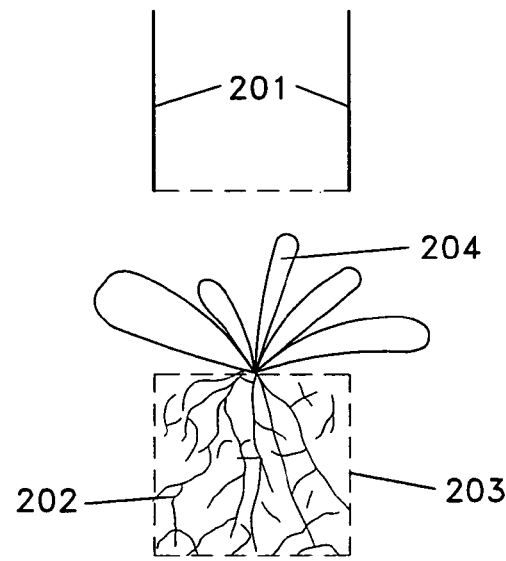
Figures 2, 3:
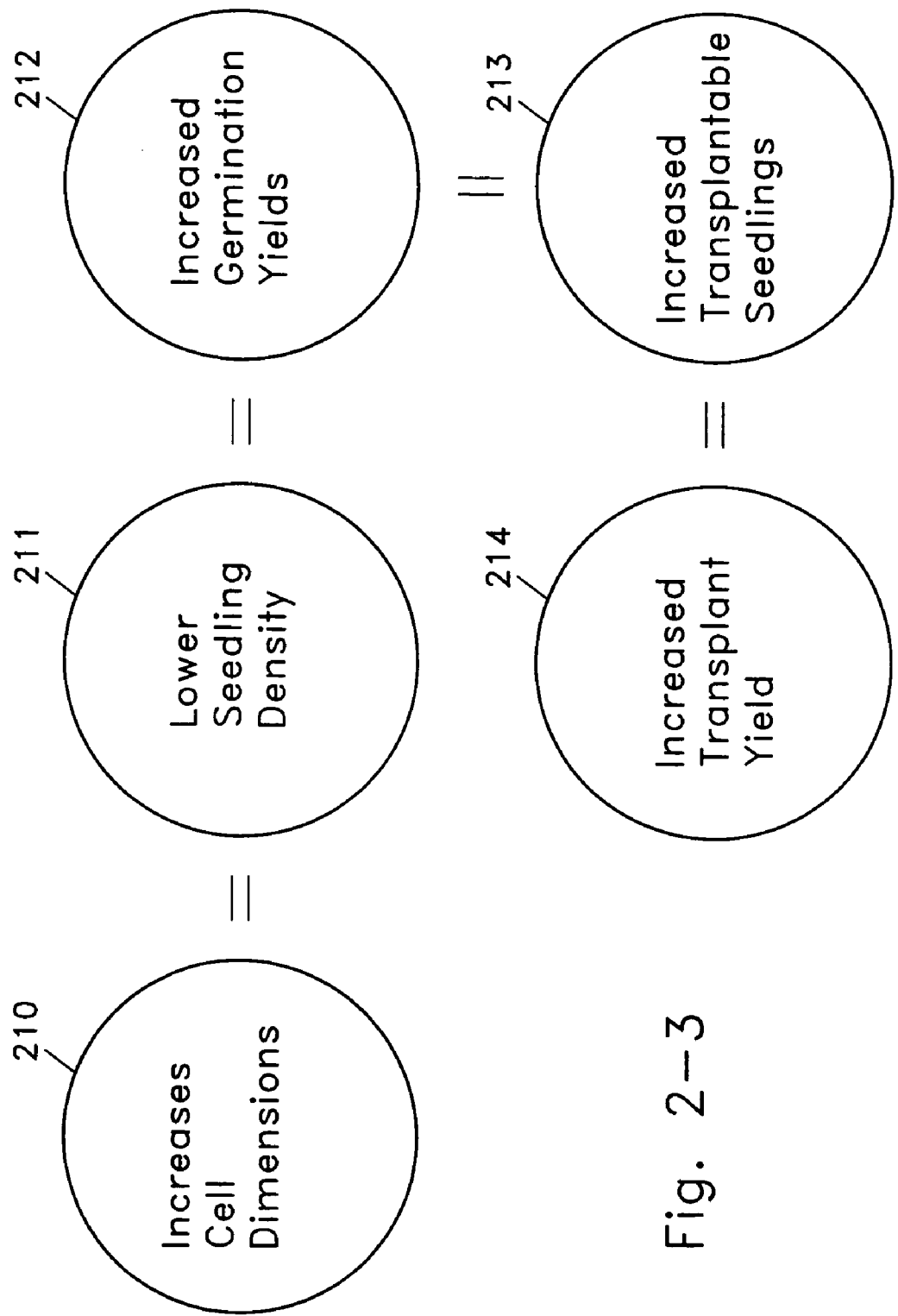
Figures 2, 3, 4, 4A:
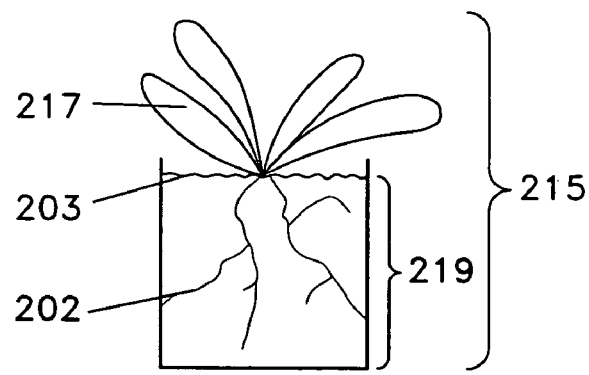
Figures 2, 3, 4, 4B:
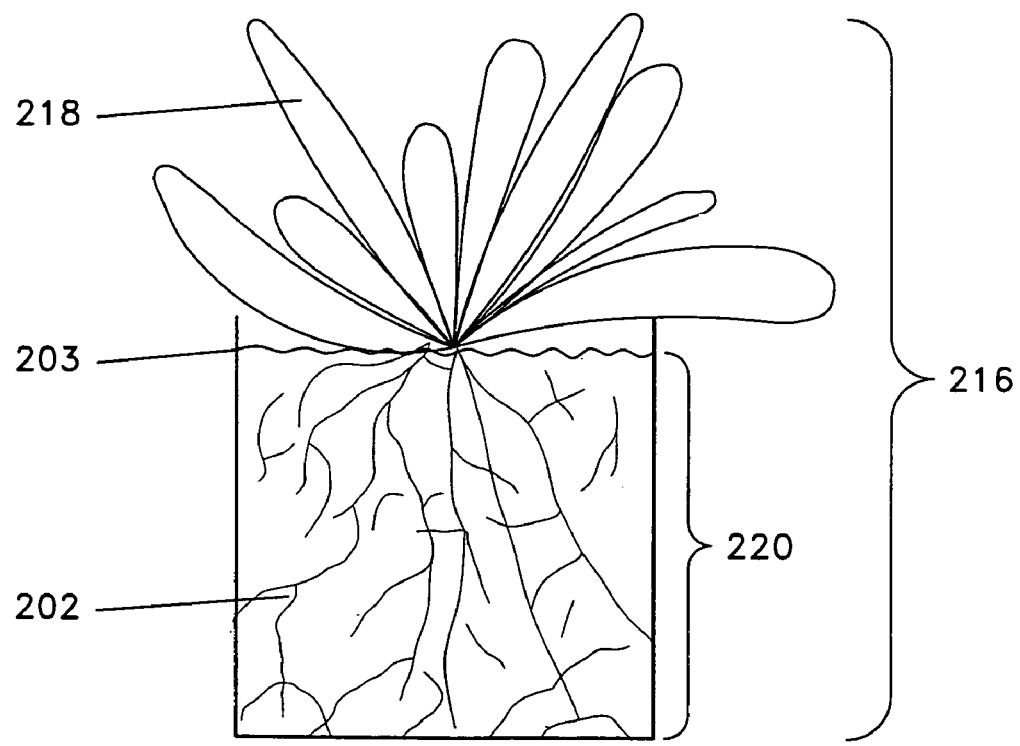
Figures 2, 3, 4, 5, 5B:
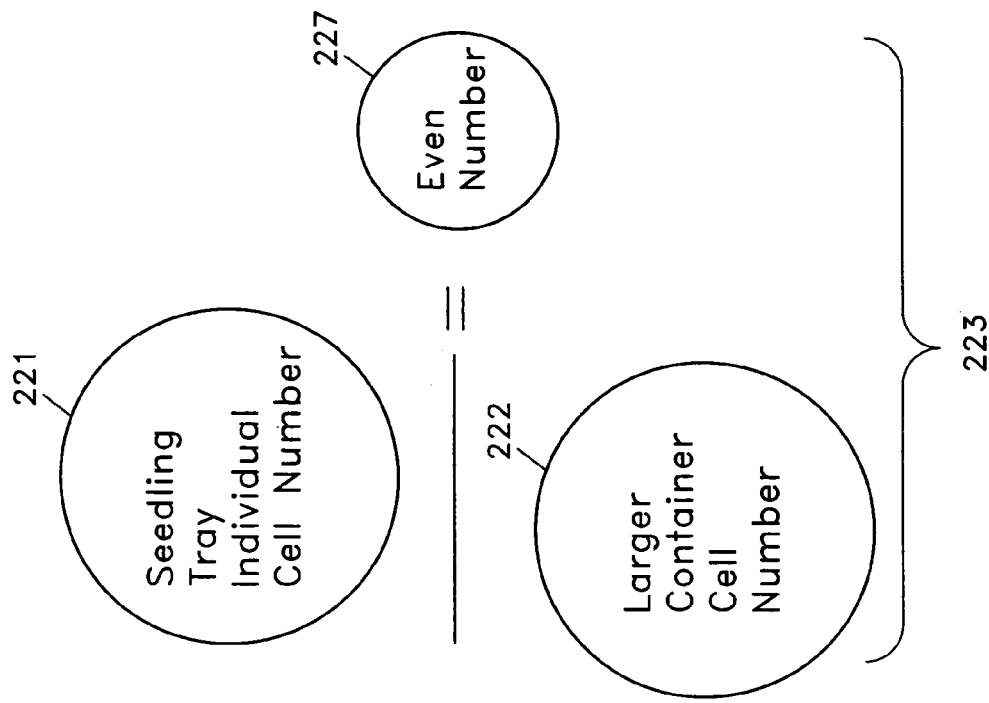
Figures 2, 3, 4, 5, 5A:
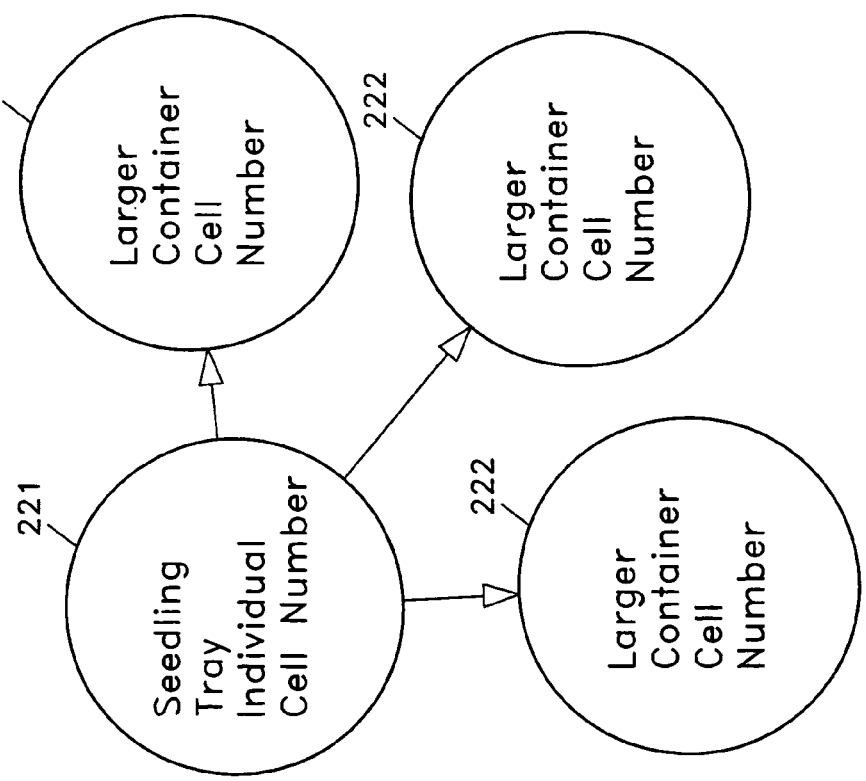

Referring to FIG. 2-1A to 2-1D, it can be seen that the first aspect is increasing the dimensions of the individual cell (201). As shown in FIGS. 2-1A to 2-1D, by increasing the individual cell (201), the roots (202) with media (203) and leaves (204) may be more easily extracted from the cell (201). The increased cell (201) dimensions can allow the leaves (204) to fold upward gently without tearing or damage during the extraction process. And once the seedling has been extracted from the cell (201), the leaves (204) may be able to more quickly settle back to their original position. The roots (202) and media (203) may remain unchanged during the extraction process.

As shown in FIGS. 2-2A to 2-6, another goal achieved by the increase in cell (201) dimension can be the increase in area available for the seed (208) to germinate on. FIGS. 2-2A to 2-2D show an effect of this increased cell (201) dimension. The seedling tray (205) can have individual cells (201) in it. As the seeding wheel (206) picks up seed (208) on the seed (208) pick-up points (207) and turns over the seedling tray (205) the seed (208) can be dropped by the seedling wheel (207) onto the media (203) of the individual cell (201). By increasing the cell (201) dimension, the number of seeds (208) that the seeding wheel (207) is required to pick up can be reduced. So an increased number of cells (201) have seed (208) in them after sowing. The increased cell (201) dimension can also allow for better seed (208) placement in the middle of the cell (201) where the seedling (209) has the best space for leaf (204) development without crowding from neighboring cells. And the roots (202) can have better development because of more uniform moisture than at the edge of the cell (201).

An aspect of the invention as shown in FIG. 2-3 is the relationship of increased cell dimensions and it's effect on increased transplant yield (214). Small cell dimensions can result in high seedling density, which can reduce germination yields due to shading between adjoining cells. Increases in cell dimensions (210) may result in lower seed density (211) per tray. The lower seed density (211) can produce increased germination yields (212) by reducing shading and overlapping (when grown) from seedlings in close proximity to each other. The increased germination yield (212) may allow for increased transplantable seedlings (213). Increased transplantable seedlings (213) can, in turn, result in increased transplant yield (214) which reduces production costs.

In one embodiment, the ratio of the cell dimension to the cell or seedling density can be dependent on the characteristics of the seedling variety. Some upright-stemmed seedlings with a small leaf area could have a lower ratio of cell dimension to seedling density while some multi-branched have a large leaf area and may have a higher-ratio of cell dimension to seedling density. The ratio therefore, can vary depending on the seedling. In one embodiment, it may fall between 1.75:1 and 2.5:1, more generically these values may be about 1:1, 2:1, or 3:1. It may even match the requirement of the transplanter ratios of the vertical cross section head size or area relative to cell cross section.

In accomplishing the embodiment having a larger cell area, the system can be seen to provide a matrix of area extravagant containers, that is containers having a cross sectional area at their top or throughout which is larger or considered extravagant at any point as compared to a traditional container for a particular species for a particular transplant modality. The container may even be a post transplant growth sized container, that is one which would be traditionally considered appropriate for the size of a plant as it would exist at some stage after transplant. For a generic size or for a typical species used, such containers may be at least about 1.95 square cm in area. This may be appropriate for many of the species listed earlier.

As easily appreciated from FIG. 3-2B, the matrix of containers may be interconnected by a web (321) to form a tray (322). This web may be a substantially planar formable web in that it may be arranged to be formable into a planar configuration at least some time in use. By making the web (321) have more area than as traditionally considered optimum, the entire tray (322) may be considered to present a yield enhanced subdued density matrix. The matrix may thus present an excess web area matrix. This can serve to have an intentionally lower density of containers than considered traditionally optimal. For example, the propagule transplant container density value may be at least about 0.33 containers per square cm. The subdued density matrix may also have a density adapted to achieve an optimized morphological growth criterion selected from a host of options.

Similar to the aspect of having an excess area container, another embodiment may include an excess root area transplant container or even an excess root volume container. This is in keeping with the previously mentioned objective of improving the root system of the seedlings in their individual cells by increasing the amount of rooting media available for the seedlings to germinate in. This may allow the root system to develop more completely before transplanting and may even allow seedling varieties with tap or heavy root systems to use this type of transplant process. The improved root system may increase the vigor of the seedling making it more successful during the stress of the mechanical transplanting process. The seedling may also experience less tearing of the root system and may have more roots available for assimilation into the new media of the larger container after transplanting. This may decrease the mortality rate after transplant. By increasing the amount of rooting media, the seedling may be able to be in the germination tray longer so the seedling may be more mature at transplant and thereby transplant-yields will increase.

Ratios of root area or root volume can be similar to cell dimensions for seedling density per seedling tray. As one example, ratios of 1.5 to 3.0 may be typical depending on the type of root system the seedling naturally develops due to genetics. In another example the ratio of container volume to root volume may be at least about 5:1 or even 3:1. This ratio can also be consistent with the requirements of the transplanter ratios of the vertical cross section of the head and the depth of the transplanter during the transfer process. In such an embodiment, the system may use volume extravagant propagule transplant containers. In another example, these containers could even have individual volumes of at least about 3 CM 3. They would thus serve as excess root volume containers. Generally, the system may simply have a root coordinated propagule transplant container size, or perhaps even a root disturbance avoidance propagule transplant container size so that during transplant, the roots would likely not be disturbed to a degree sufficient to not experience the enhanced yield or other effects desired.

Another aspect of an embodiment is to make sure that seedling maturity (104) is matched with mechanical transplanter requirements (102) as shown in FIG. 1-2. Optimum seedling maturity (104) may be achieved through the management of the complex environment (105). This environment (105) may include light level (106), heating and cooling (107), nutrient level (108) and moisture level (109). These aspects of growing the seedling by the greenhouse operator most likely involve detailed and constant monitoring to achieve the goal of optimum seedling maturity (104). The greenhouse operator may also use chemicals (110) to control insects (111) and disease (112). Chemicals (110) may also be used to control plant growth. Managing insets (111) and disease (112) may be critical to insuring that optimum seedling maturity (104) is achieved.

The mechanical transplanter requirements (102) may also be used to determine the exact optimum seedling maturity (104) based on the method of mechanical transfer from the small cell to the larger container. It may be advantageous to neither transplant too early (e.g., not robust enough for the stress of transplanting, etc.) nor too late (e.g., too large for the container, etc.). This relationship between optimum seedling maturity (104) and the mechanical transplanter requirements (102) may result in increased transplant yields (103). The plant development stage at transplant may be specific to the growth environment involved. It may involve providing a planned time of transplant which is selected from an apparent maturity factor related to the average development traditionally used. As one example, an average development may be related to a mature, developed plant and percentages of this maturity may be desired at the time of transplant. In one example, maturity of about 30, 20, 10, or even 5 percent of a mature development for a species may be used. Perhaps surprisingly, by using an earlier stage of transplant, faster growth may be achieved. At the other end of the spectrum, late transplanting (with likely a commensurately larger container) may be used. In this example, percentages of maturity of about 100, 95, 85, 75, or even 65 percent of a mature development may be used. These may be estimated by utilizing a time of growth for transplant value which may be species or transplant modality specific, of course. As to transplant time, the optimal time to transplant may vary by species, of course, however some values may apply such as: at about 4 weeks, at about 5 weeks, at about 6 weeks, at about 7 weeks, at about 8 weeks, at about 9 weeks, and even at about 10 weeks.

Another goal of the invention may be to increase the maturity and therefore amount of the roots (202) as shown in FIGS. 2-4A to 2-4B. A small cell (215) can have an immature seedling, which may have immature roots (219) and immature leaves (217) and therefore may be difficult to transplant. The immature roots (219) may be inadequate to hold the media (203) together, so the media (203) may fall away from the immature roots (219). This may cause root (202) damage due to tearing or breaking and excessive drying. The immature leaves (217) may also be susceptible to tearing and crushing during the transplanting process because they may be small and there may be only a few of them. If the seedling loses photosynthesis area, overall seedling vigor will be reduced. Torn or crushed leaves may also provide entry sites for insects and disease, which may reduce the overall vigor of the seedling. Mature leaves (218) and mature roots (220) may only be available when the seedling is in a larger cell (216) which may give the seedling the time required to develop mature leaves (218) and mature roots (220) without crowding due to small cell dimensions.

As shown in FIGS. 1-4A to 1-4C, seedling leaf size and leaf type (113) as it relates to mechanical transplanter requirements (102) to increase transplant yield (103) is a noteworthy aspect. Seedling leaf size (114) is shown as a proportion to cell size (115) in FIG. 1-4A. The leaf size (114) may be determined first by the genetics of the seedling. But the greenhouse operator may have influence on how the seedling natural genetics express them, so leaf size (114) can be influenced by the environment (105). The leaf size (114) must be large enough to support plant photosynthesis but small enough to allow the mechanical transplanter requirements (102) to be met without damaging the leaf. Leaf type, as shown in FIG. 1-4B (116), may also be considered. Again the genetics of the seedlings may determine the seedling leaf type (116). Greenhouse operators have little influence on leaf type (114) through management of the environment (105); however, the leaf type (116) proportion to the cell size (115) may make a difference based on the mechanical transplanter requirements (102). Broad, wide leaves may, of course, need more space in the cell size (115) than narrow leaves. The mechanical transplanter requirements (102) may need to be matched with the cell size (115) to insure that the leaf size (114) and leaf type (116) are not damaged during the transfer process from small cell to larger container as shown in FIG. 1-4C. Successful transfer with no damage may increase transplant yields (103).

As with all aspects of this invention, the system and values used may be varied to suit the species and/or the transplant modality involved. Perhaps surprisingly interactions can exist. The leaf size of the propagule involved can impact the moisture uniformity involved. Regardless, a host of factors can be used. These may include a plant dimension value, a leaf dimension value, a ratio involving any factors, and combinations and permutations of any factors. One factor of particular concern and mentioned earlier, is that of the leaf canopy area (the area underneath a perimeter shape of the leaves) relative to the transplant container. Here, it can be important to avoid leave overlap, and as such the system would include a leaf overlap avoidance matrix. This could be accomplished by container or web size alone to provide a leaf overlap avoidance matrix. Similarly, the propagule transplant container size to leaf area ratio may be at most about 1:1, 2:1, or even 3:1. This may be appropriate for upright plant type leaf areas as well. The size of the container may also be selected to provide a leaf fit-through propagule transplant container size.

Referring to FIG. 1-5B, another important aspect of an embodiment is that optimum seedling development (117) be coordinated with the mechanical transplanter requirements (102) to achieve increased transplant yields (103) as shown in FIG. 1-5B. Optimum seedling development (117) can be a combination of the relationship of root (118), stem (119), leaf (120) and cell size (115). FIG. 1-5A in cross section shows the cell (121) with the media (123). Roots (122) may need to fill the media (123) and cell (121) completely to protect the roots (122) during transfer from the small cell to the larger container. Healthier and stronger root (122) systems may result in increased transplant yields (103). In an embodiment, the root (118) may not be so mature or heavy that it exceeds the capacity of the cell (121) by growing out the bottom or top. The media (122) may preferably be porous enough for adequate water drainage and to provide air to the roots (118), but not so course as to allow the plant (123) to dry out too quickly. The media (122) may completely fill the cell (121) without compaction or excessive fluffing. The plant (123) may also need to be sized proportionally to the cell (121). Too many leaves or too few leaves may affect the transfer from the small cell to the larger container. The mechanical transplanter requirements (102) may need to be matched to the plant (123) and root (118) and other factors to achieve increased transplant yields (103). Many factors can be considered, of course, including but not limited to the amount of light received, the specific fertilizers utilized, the amount of water received, the humidity involved, the temperature involved, the insects present in the environment, and the like.

Another aspect of the invention as illustrated in FIG. 1-3 may be the effect of geography (124) and time of year (125) on both the seedling environment (126) and transplanted seedling environment (127). FIG. 1-3 shows that geography (124) could be factored into the seedling environment (126) during the time before transplanting. Seedlings grown in at a different geography (124) may require different environments (105) to achieve optimum seedling development (117). Seedlings grown in more southern climates may, of course, require different environments (105) than seedlings grown in more northern climates. Geography (124) may also be important to the transplanted seedling environment (127). It is preferred that seedlings be acclimated to the geography (124) where they will be transplanted to increase transplant yields (103). Time of year (125) may also affect how the seedling environment (126) is managed. Summer versus winter may require different environments (105) to achieve optimum seedling development (117). The transplanted seedling environment (127) may change depending on the time of year (125), summer versus winter. As mentioned earlier, the location involved at any growth stage may be considered as well. As one example, the latitude involved at any growth stage (e.g., where shipped from or where shipped to, etc.) may provide an opportunity for a climate or even a light coordinated propagule transplant container size. More generically there may be a location coordinated propagule transplant container size which takes into account a location factor criterion such as an initial growth location factor criterion, a secondary growth location factor criterion, or even a delivery location factor criterion. The location maturity may even be determined relative to some standard such as a mid-latitude US transplant maturity. In this example, values such as about 0.8 of a typical mid-latitude US transplant maturity; about 0.9, about 1.1, about 1.2, about 1.3, about 1.4, or even about 1.5 may be used based on where the product is shipped, transplanted, or the like. A simple table of values could even be used as part of the system to achieve an enhanced yield.

As to each of the above, one or more adjustment factors may be used to address climatic, seasonal, or locational differences at anticipated time of delivery. Tailored values using a correction factor to any of the above possibilities may be used such as correction values of perhaps: about 1.0 for mid US temperate latitudes (i.e. no correction factor), about 1.0 for mid spring seasonal shipments (again, no correction factor), about 1.1 or about 1.2 for early spring seasonal shipments, about 1.3 or about 1.2 for colder more northern or mountainous latitudes or locations, about 0.90 or about 0.80 for more northern coastal locations, about 0.9 or about 0.8 for early summer seasonal shipments, about 1.4 or about 1.5 for winter seasonal shipments, and even about 0.9 or about 0.8 for southern US latitudes.

Considering the aforementioned aspects, a variety of values may be used for the ratios mentioned as well. Referring to FIG. 1-4C, as but a few examples, some ratios of vertical cross section seedling leaf size (114) and type (116) (e.g., max or mean diameter) or area relative to cell (121) cross section size or area may include values such as: less than about 1.30, less than about 1.10, less than about 1.0, less than about 0.95, less than about 0.90, and less than about 0.80. Additional ratios of "mature" (e.g., at time of transplanting) root (118) volume (measured with or without typical amounts of retained media (122)) to cell (121) volume may include values such as: less than about 90%, less than about 75%, less than about 60%, less than about 50%, less than about 40%, and even less than about 30%. Additional ratios of transplant age or size as compared to the corresponding age or size of a grown, usually flowering, plant may include values such as: less than about 25%, less than about 20%, less than about 15%, less than about 10%, and even less than about 5%.

As alluded to and as illustrated in FIG. 1-5B, in coordinating the transplanter head to the plant or cell (121) size values may include some ratios of vertical cross section head size or area relative to cell (121) cross section size or area may include values such as: less than about 70%, less than about 50%, less than about 33%, less than about 30%, less than about 25%, and even less than about 20%. Again, it should be understood that all these values may be further varied to coordinate to particular species and customers needs. A key aspect, however, is the possibility of now optimizing growing methods, environments, and devices to provide a more optimal yield for the grower. A plant punch element cross section to propagule transplant container size ratio of at most about 0.75:1, 0.50:1, 0.25:1 may be appropriate for some embodiments. Thus the system may present a plant punch type coordinated propagule transplant container size.

Another aspect of an embodiment of the invention can be the ratio of the punch head to the seedling's cell dimensions. By increasing the size of the seedling's cell dimensions to allow for a more mature plant to be transferred to the new larger container or tray and by adjusting the physical size of the punch head, the correct ratio of punch head to cell dimension can be achieved. In one embodiment, this ratio may even be viewed as not being larger than 30% of the cell dimension. It may even be as small as 15% of the cell dimension. Further, the ratio variance can be dependent on the requirements of the seedling based on the seedling genetics and the size of the cell dimensions required to accommodate those seedling genetics to produce an optimum transplantable seedling. The smaller ratio of punch head to cell dimension can help to prevent the punch head from coming into direct contact with the seedling during the punch-down process. Yet, the punch head can also be designed to be sufficiently large enough to insure complete extraction of the seedling as it is punched down into the new larger container or tray. This can reduce damage to leaves and stem resulting in a healthier seedling being transferred to the larger container and tray. This can result in increased transplant yield and reduced production costs.

FIG. 4-3A to 4-3C illustrates another goal of the invention—to eliminate the crushing or breakage of the seedling leaves (412) and stems (411) and the potential for compaction of the seedling roots (413). As shown in FIGS. 4-3A to 4-3C, the punch head (414) can descend on the seedling where the punch head face (415) may come in contact with the seedling leaves (412) and seedling stem (411). Because the shape of the punch head face (415) may be a blunt convex shape, the seedling leaves (412) and seedling stem (411) may be gently moved to the side as the punch head (414) descends. Once the punch head (414) is fully in contact with the media (407), the punch head face (415) can put pressure on the media (407) without substantially penetrating the media (407) or damaging the seedling roots (413). The seedling stem (411) and seedling leaves (412) are usually pliable enough for the punch head to move them gently with out breakage or crushing. This can increase transplant yields because seedlings are not damaged allowing insects and disease to enter and reduce seedling vigor.

Earlier it was mentioned that the entire system may be coordinated with the stem or other growth events of the plant. The system may use a stem type coordinated propagule transplant container size, which takes into account the type of stem involved to make an appropriate transplant and growth event for such a consideration. In this regard it can be important to avoid the stem from stretching up and so there may be a stem stretch up avoidance factor considered. Similarly, there may be a leaf type coordinated propagule transplant container size, a sub-leaf micro environment control factor, a shade coordinated propagule transplant container size or other element, a time of year size or other element, a growing season factor, an amount of time allotted for growth factor, a leaf type factor, a stem type factor, and even a root type factor.

The system may also provide for events which are selected to allow the plant to be better conditioned to withstand the stress of transplantation. This may be accomplished not only by growing in an appropriate environment but also by preconditioning the plant. For example, the system may provide for subjecting juvenile plantlets or other stages to new environments prior to transplanting or as an event of pre-transplant conditioning. This new environment could be gently provided and could even be accomplished as or before a pre-transplant shipping event. If shipping were the event to be considered, the system could be designed for transplanting at a time selected from at least about 2, 3, 5, or even 7 days after the shipping occurred so that the plant would have had an opportunity to be adequately recovered from that stress.

Moisture can be an important factor. Through container size or otherwise, the designs or components can establish any moisture deficit areas away from a root. Thus merely a larger cross sectional area may be used as a moisture coordinated propagule transplant container size. The container edge moisture coordinated propagule transplant container size may allow that dry areas are somewhat assured as being away from the roots involved. Thus there can be considered to exist a moisture deficit area coordinated propagule transplant container size. This can serve as a media dry-out avoidance factor.

The aspect of waste due to uncoordinated sizes and left over plantlets is one that can be easily solved by providing ratios that are appropriate to the overall system. A coordinated number propagule transplant container matrix and coordinated number adolescent plant container matrix are ones that when used do not result in a left over amount of plantlets. By having an even division with no decimals or remainders, such unnecessary waste can be avoided. Thus the entire system can include a coordinated number propagule transplant container matrix and a coordinated number adolescent plant container matrix. By improving the ratio of seedling tray individual cells to larger container individual cells there may be no leftover seedlings after the larger trays have been transplanted. This improved ratio may also prevent empty cells in the larger containers or trays due to lack of seedlings available to be punched down because the seedling tray is empty.

By punching down multiple seedling trays into multiple larger containers or trays, efficiency can be increased by 2 or 3 or 4 or more times per single punch-down action. This can prevent greenhouse operators from needing to transplant leftover seedlings by hand which is labor intensive and therefore expensive. It can also prevent greenhouse operators from needing to patch large containers or trays that have empty cells because no seedling was punched into them. Finally the improvement in efficiency of 2 or 3 times may reduce production costs. All this is illustrated in FIGS. 2-5A to 2-5B which show this relationship and the multiplying factor of seedling trays to finished containers. The seedling tray individual cell number (221) may be divisible by the larger container cell number (222) in an even number (227) (without a remainder/decimal). This ratio of seedling cells to larger container cells (223) can be achieved by both or either increasing or decreasing the seedling tray individual cell number (221) or by both or either increasing or decreasing the larger container cell number (222). This may also be accomplished by increasing the number of trays being transplanted at one time.

Figures 2, 3, 4, 5, 6:
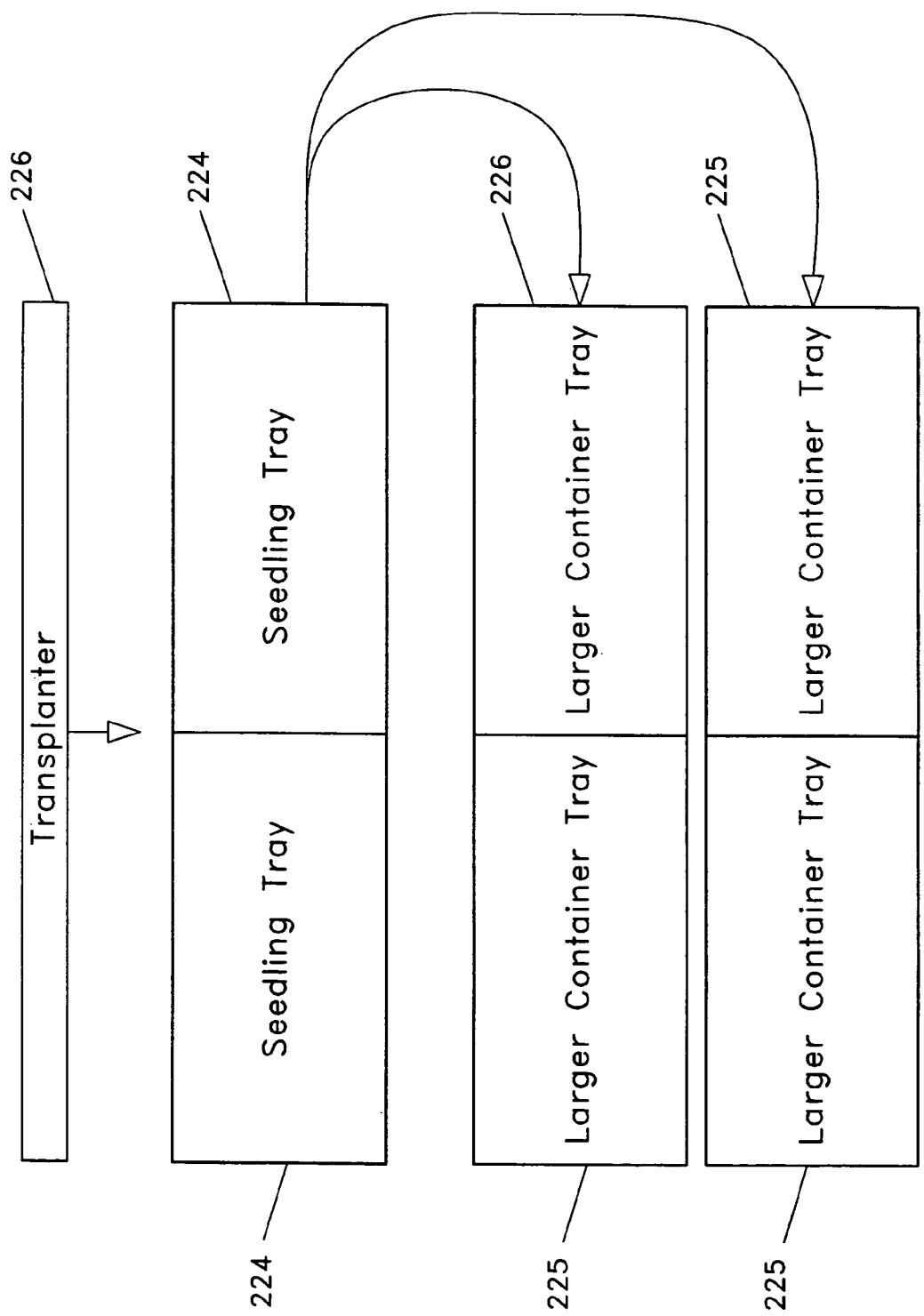
Figures 1B, 3:
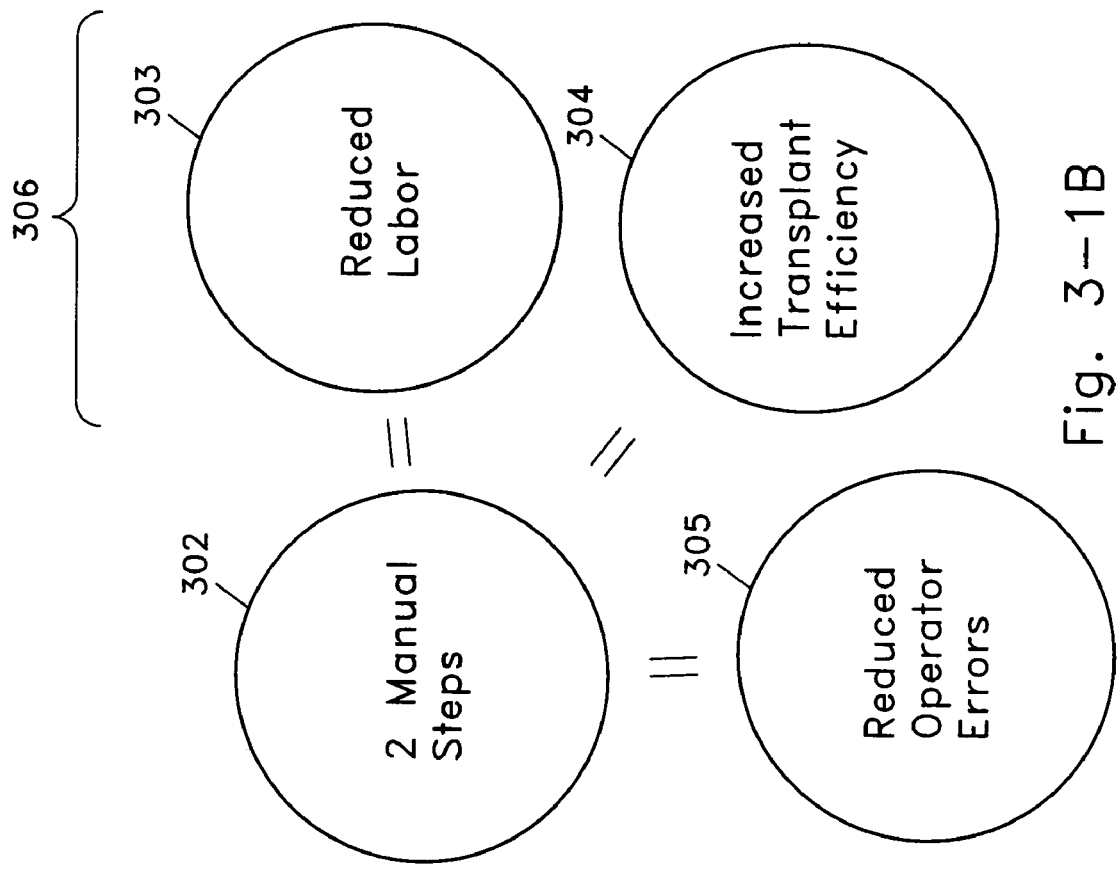
Figures 1A, 3:
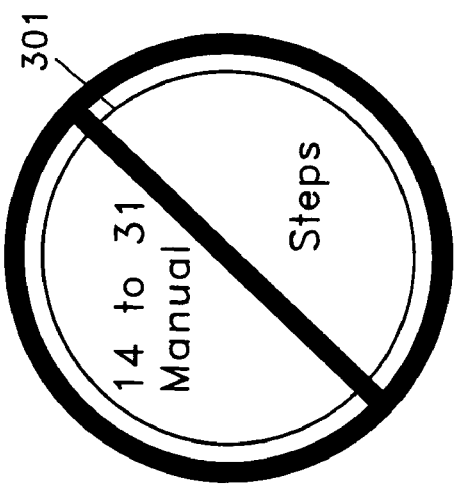
Figures 2A, 2B, 4:
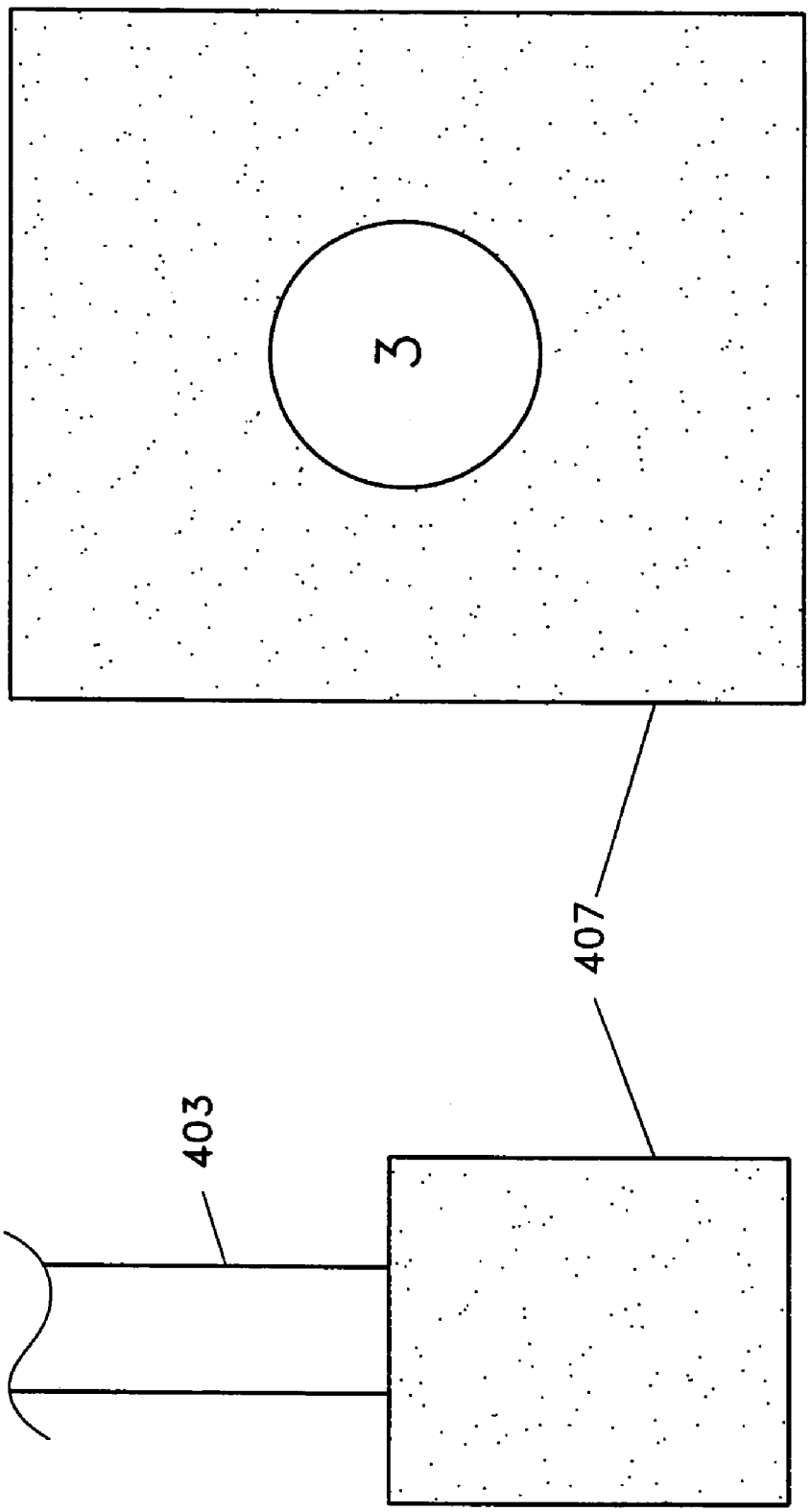
Figures 4, 4B:
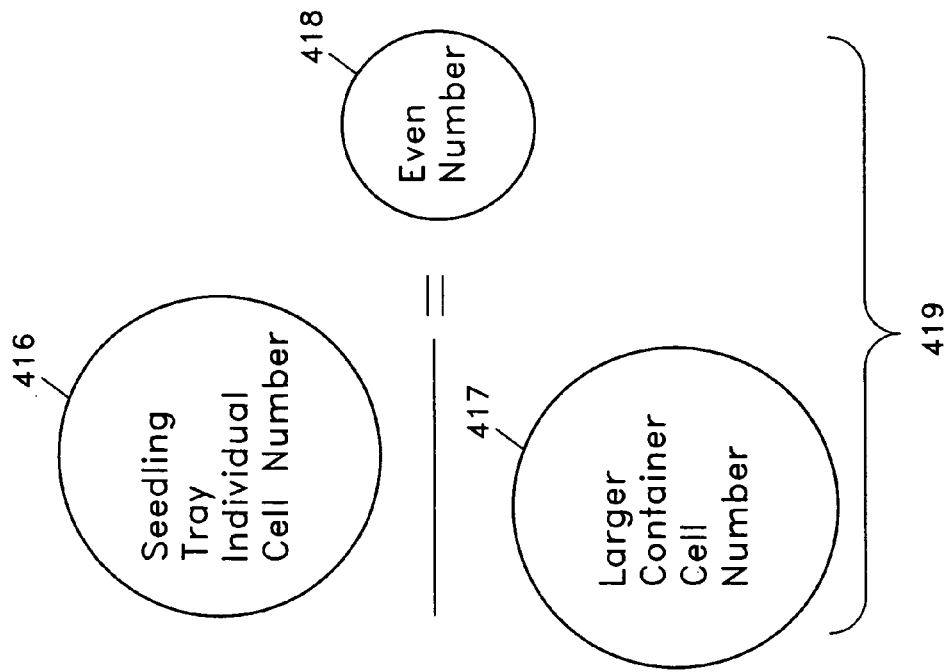
Figures 4, 4A:
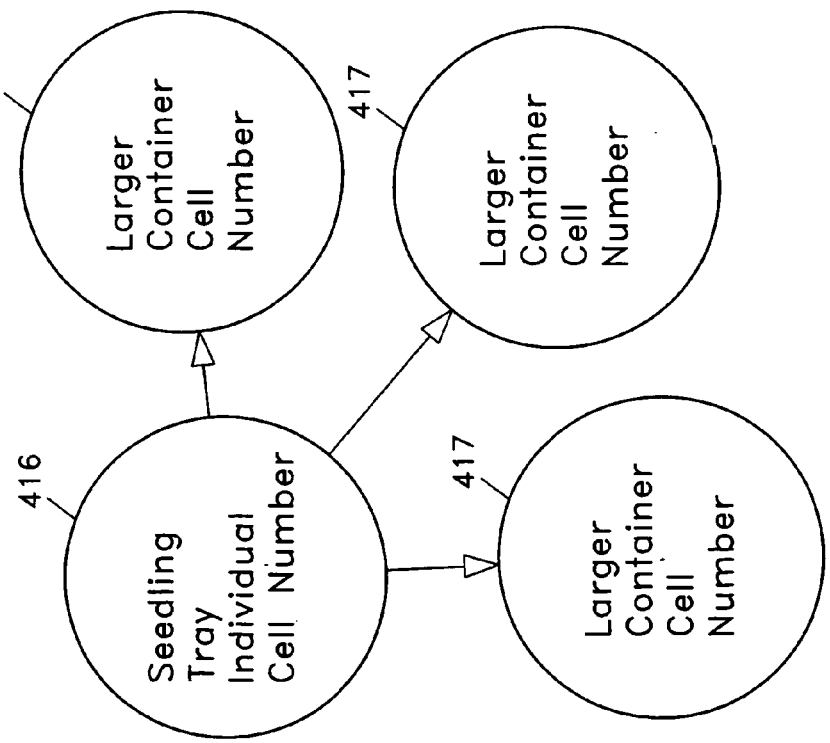
Figures 4, 5:
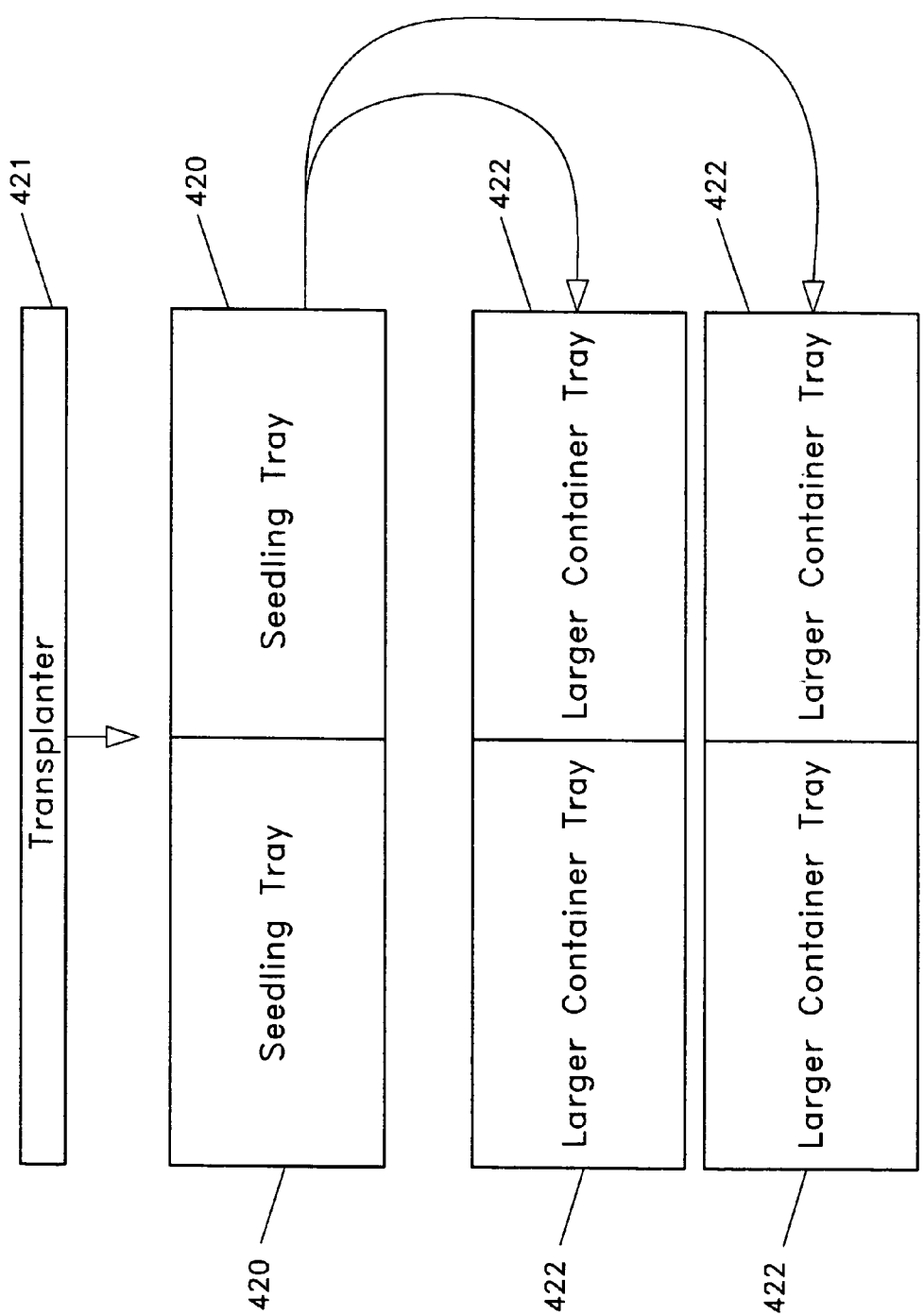
Figures 1, 5:
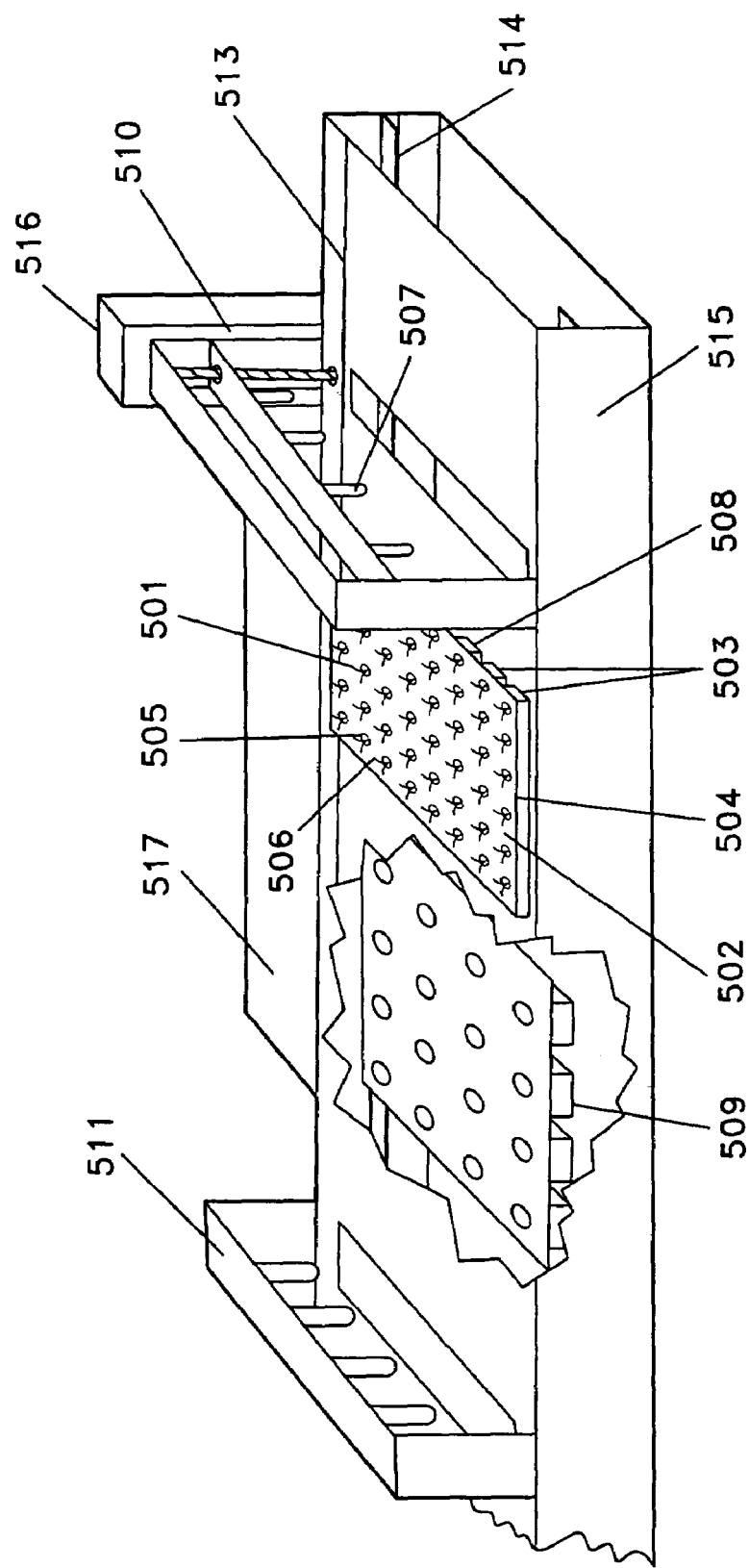

Instead of a single seedling tray, multiple seedling trays may be used to transplant seedlings from. This may increase the efficiency of the transplanter by increasing the number of trays being transplanted with a single motion as shown in FIG. 2-6. Multiple seedling trays (224) may be put through the transplanter (26) at the same time to achieve the correct multiple based on the large container tray (225). This can eliminate "left-over" seedlings due to incorrect multiples. And can improve the efficiency of the transplanter (226). FIGS. 4-4A to 4-4B also show this relationship and the multiplying factor of seedling trays to finished containers. The seedling tray individual cell number (416) may be divisible by the larger container cell number (417) in an even number (418) (without a remainder/decimal). This ratio of seedling cells to larger container cells (419) can be achieved by both or either increasing or decreasing the seedling tray individual cell number (416) or by both or either increasing or decreasing the larger container cell number (417). This may also be accomplished by increasing the number of trays being transplanted at one time. Instead of a single seedling tray, multiple seedling trays may be used to transplant seedlings from. This can increase the efficiency of the transplanter by increasing the number of trays being transplanted with a single motion as shown in FIG. 4-6. Multiple seedling trays (420) may be put through the transplanter (421) at the same time to achieve the correct multiple based on the large container tray (422). This can eliminate "leftover" seedlings due to incorrect multiples. And it may improve the efficiency of the transplanter (421). The increase in efficiency can even be about 2–3 times.

As can be easily understood from the foregoing, the basic concepts of the present invention may be embodied in a variety of ways. It involves both plant production techniques as well as devices to accomplish the appropriate production yields. In this application, the plant production techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method- or process-oriented terminology, each step is implicitly performed by a device or component. Importantly, neither the description nor the terminology is intended to limit the scope of the claims or scope of this patent.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

Further, each of the various elements of the invention and claims may also be achieved in a variety of manners. This disclosure should be understood to encommpass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "transplanter" should be understood to encompass disclosure of the act of "transplanting"—whether explicitly discussed or not—and, conversely, were there effectively disclosure of the act of "transplanting", such a disclosure should be understood to encompass disclosure of a "transplanter" and even a "means for transplanting". Such changes and alternative terms are to be understood to be explicitly included in the description.

Any patents, publications, or other references mentioned in this application for patent are hereby incorporated by reference, including but not limited to the following listed references. As to any references, however, to the extent that such information or statements incorporated by reference might be considered inconsistent with the patenting of this/these invention(s) such statements are expressly not to be considered as made by the applicant(s). In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference.

| I. | | U.S. PATENT DOCUMENTS | | | |
|---|---|---|---|---|---|
| DOCUMENT NO | DATE | NAME | CLASS | SUBCLASS | FILING DATE |
| D 272,726 | Feb. 21, 1984 | Kaneko | D11 | 02 | Sep. 01, 1981 |
| 3,331,155 | Jul, 18, 1967 | Chancellor | 47 | 37 | Oct. 22, 1964 |
| 3,386,608 | Jun. 04, 1968 | Diller, K. | 220 | 23.6 | May 15, 1967 |
| 3,446,164 | May 27, 1969 | Huang, B. K., et al. | 111 | 3 | Feb. 20, 1967 |
| 3,447,261 | Jun. 03, 1969 | Hundt | 47 | 34.13 | Oct. 05, 1966 |
| 3,517,629 | Jun. 30, 1970 | Bridges et al. | 111 | 96 | Aug. 16, 1967 |
| 3,524,419 | Aug. 18, 1970 | Middleton | 111 | 2 | Jun. 27, 1968 |
| 3,561,158 | Feb. 09, 1971 | Marcan | 47 | 34.13 | Oct. 08, 1968 |
| 3,712,252 | Jan. 23, 1973 | Huang | 111 | 2 | Nov. 06, 1970 |
| 3,799,078 | Mar. 26, 1974 | Blackmore, et al. | 111 | 2 | Apr. 19, 1972 |
| 3,820,480 | Jun. 28, 1974 | Blackmore, et al. | 111 | 2 | Sep. 17, 1973 |
| 3,903,643 | Sep. 09, 1975 | Blackmore, et al. | 47 | 34.13 | Mar. 22, 1974 |

-continued

I. U.S. PATENT DOCUMENTS

| DOCUMENT NO | DATE | NAME | CLASS | SUBCLASS | FILING DATE |
|---|---|---|---|---|---|
| 3,949,523 | Apr. 13, 1976 | Lehtipuu | 47 | 34.13 | Nov. 01, 1974 |
| 4,106,414 | Aug. 15, 1978 | Vastag | 111 | 1 | Sep. 20, 1976 |
| 4,197,674 | Apr. 15, 1980 | Blackmore, Jr. | 47 | 73 | Jun. 16, 1978 |
| 4,244,308 | Jan. 13, 1981 | Vince | 111 | 89 | Sep. 18, 1978 |
| 4,248,014 | Feb. 03, 1981 | Williames | 47 | 86 | Jan. 04, 1979 |
| 4,389,814 | Jun. 28, 1983 | Andreason, et al. | 47 | 73 | Feb. 04, 1981 |
| 4,408,549 | Oct. 11, 1983 | Qvarrstrom | 111 | 2 | May 27, 1981 |
| 4,481,893 | Nov. 13, 1984 | Qvarrstrom | 111 | 2 | Dec. 13, 1982 |
| 4,616,578 | Oct. 14, 1986 | Talbott | 111 | 2 | May 12, 1983 |
| 4,644,880 | Feb. 24, 1987 | Branch | 111 | 3 | Feb. 22, 1985 |
| 4,910,146 | Mar. 20, 1990 | Tur-Kaspa | 435 | 284 | Jul. 18, 1988 |
| 4,947,582 | Aug. 14, 1990 | Visser | 47 | 101 | Jul. 13, 1989 |
| 5,048,434 | Sep. 17, 1991 | Forster, et al. | 111 | 105 | Apr. 23, 1990 |
| 5,225,345 | Jul. 06, 1993 | Suzuki, et al. | 435 | 284 | Jul. 19, 1991 |
| 5,320,649 | Jun. 14, 1994 | Holland | 47 | 1.01 | Aug. 18, 1992 |
| 5,425,202 | Jun. 20, 1995 | Mekler | 47 | 58 | Jul. 27, 1993 |
| 5,779,048 | Jul. 14, 1998 | Dunn | 206 | 449 | Oct. 17, 1996 |
| 5,779,049 | Jul. 14, 1998 | Werby et al. | 206 | 451 | Feb. 07, 1996 |
| 5,871,102 | Feb. 16, 1999 | Lambert | 206 | 738 | Mar. 11, 1997 |
| 6,029,425 | Feb. 29, 2000 | Dunn | 53 | 449 | Mar. 13, 1998 |

II. OTHER DOCUMENTS (Including Author, Title, Date, Pertinent Pages, Etc.)

U.S. provisional application, 60/263,802, entitled "Growing System to Maximize Plant Transplanting Yields", filed Jan. 24, 2001
U.S. provisional application, 60/276,874, entitled "Automated Plant Transplanting System", filed Mar. 14, 2001
U.S. provisional application, 60/273,420, entitled "Coordinated Plant Transplanting System", filed Mar. 5, 2001
U.S. provisional application, 60/296,915, entitled "Operational System for Transplanting Growing Plants", filed Jun. 8, 2001

The claims set forth in this specification by are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extention thereon.

Thus, the applicant(s) should be understood to have support to claim at least: i) each of the plant production methods as herein disclosed and described, ii) the related devices disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the elements disclosed, and xi) each dependent claim as a dependency on each and every one of the independent claims presented. In this regard it should be understood that for practical reasons and so as to avoid adding potentially hundreds of claims, the applicant has presented the claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim as dependencies or elements under any other independent claim. Further, as used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

What is claimed is:

1. A method of cultivating plants comprising the steps of:
   a. determining at least one externally manifested punch-transplant-specific transplant-plant-size-excluded morphological growth criterion appropriate to a given plant species and a given transplant modality and involving at least one yield sensitive criterion;
   b. placing growth media and a plurality of propagules for said plant species in a first matrix of area extravagant propagule transplant containers adapted to achieve an enhanced production yield which is statistically increased over a traditional transplant production yield for said species;
   c. interconnecting said first matrix of propagule transplant containers by a formable web;
   d. nurturing an initial growth of said propagules for said plant species in said first matrix of propagule transplant containers to create a first growth matrix of juvenile plantlets;
   e. establishing a matrix of individual transplant cohesive intermingled plant-media masses from a portion of said growth media and each of said juvenile plantlets;
   f. affirmatively establishing said at least one externally manifested punch-transplant-specific transplant-plant-size-excluded morphological growth criterion for a substantial portion of said plurality of juvenile plantlets while situated in said first matrix of propagule transplant containers;
   g. extruding a substantial portion of an individual transplant cohesive intermingled plant-media mass from a propagule transplant container at a time when said punch-transplant-specific transplant-plant-size-excluded morphological growth criterion is substantially established;
   h. inserting at least one individual transplant cohesive intermingled plant-media mass in an adolescent plant container immediately after extruding a substantial portion of an individual transplant cohesive intermingled plant-media mass from said propagule transplant container;
   i. secondarily growing said juvenile plantlet in said adolescent plant container to create an adolescent plant; and
   j. achieving an enhanced production yield which is statistically increased over a traditional transplant production yield for said species.

2. A method of cultivating plants as described in claim 1 wherein said step of nurturing an initial growth of said propagules for said plant species comprises the step of utilizing a controlled environment and wherein said step of secondarily growing said juvenile plantlet in said adolescent plant container comprises the step of utilizing a controlled environment.

3. A method of cultivating plants as described in claim 2 wherein said step of extruding a substantial portion of an individual transplant cohesive intermingled plant-media mass comprises the step of simultaneously extruding a substantial portion of a plurality of individual transplant cohesive intermingled plant-media masses from a plurality of propagule transplant containers in said first matrix of propagule transplant containers and wherein said step of inserting a plurality of individual transplant cohesive intermingled plant-media masses comprises the step of simultaneously inserting a plurality of individual transplant cohesive intermingled plant-media masses in said adolescent plant container matrix.

4. A method of cultivating plants as described in claim 3 wherein said step of achieving an enhanced production yield which is statistically increased over a traditional transplant production yield for said species comprises the step of achieving a production yield selected from at least one of a group consisting of:
   greater than about an eighty-five percent production yield,
   greater than about an ninety percent production yield, and
   greater than about an ninety-five percent production yield.

5. A method of cultivating plants comprising the steps of:
   a. determining at least one growth speed enhanced growth criterion appropriate to a given plant species and a given transplant modality and involving at least one yield sensitive criterion;
   b. placing growth media and a plurality of propagules for said plant species in a first matrix of area extravagant propagule transplant containers adapted to achieve an enhanced production yield which is statistically increased over a traditional transplant production yield for said species;
   c. interconnecting said first matrix of propagule transplant containers by a formable web;
   d. nurturing an initial growth of said propagules for said plant species in said first matrix of propagule transplant containers to create a first growth matrix of juvenile plantlets;
   e. establishing a matrix of individual transplant cohesive intermingled plant-media masses from a portion of said growth media and each of said juvenile plantlets;
   f. affirmatively establishing said at least one growth speed enhanced growth criterion for a substantial portion of said plurality of juvenile plantlets while situated in said first matrix of propagule transplant containers;
   g. extruding a substantial portion of an individual transplant cohesive intermingled plant-media mass from a propagule transplant container at a time when said punch-transplant-optimized growth criterion is substantially established;
   h. inserting at least one individual transplant cohesive intermingled plant-media mass in an adolescent plant container immediately after extruding a substantial portion of an individual transplant cohesive intermingled plant-media mass from said propagule transplant container;
   i. secondarily growing said juvenile plantlet in said adolescent plant container to create an adolescent plant; and
   j. achieving an enhanced production yield which is statistically increased over a traditional transplant production yield for said species.

6. A method of cultivating plants as described in claim 5 wherein said step of nurturing an initial growth of said propagules for said plant species comprises the step of utilizing a controlled environment and wherein said step of secondarily growing said juvenile plantlet in said adolescent plant container comprises the step of utilizing a controlled environment.

7. A method of cultivating plants as described in claim 6 wherein said step of extruding a substantial portion of an individual transplant cohesive intermingled plant-media mass comprises the step of simultaneously extruding a substantial portion of a plurality of individual transplant cohesive intermingled plant-media masses from a plurality of propagule transplant containers in said first matrix of propagule transplant containers and wherein said step of inserting a plurality of individual transplant cohesive intermingled plant-media masses comprises the step of simultaneously inserting a plurality of individual transplant cohesive intermingled plant-media masses in said adolescent plant container matrix.

8. A method of cultivating plants as described in claim 4 or 7 wherein said step of affirmatively establishing said at least one morphological growth criterion comprises the step of establishing an optimized morphological growth criterion selected from at least one of a group consisting of:
 a species to propagule transplant container size ratio,
 a propagule transplant container density value of at most about 0.33 containers per square centimeter,
 a leaf area to propagule transplant container size ratio,
 a leaf area to propagule transplant container size ratio of at most about 1:1,
 a leaf area to propagule transplant container size ratio of at most about 2:1,
 a leaf area to propagule transplant container size ratio of at most about 3:1,
 a species based leaf area to propagule transplant container size ratio,
 an upright plant type leaf area to propagule transplant container size ratio,
 an multi-branched plant type leaf area to propagule transplant container size ratio,
 a plant punch element cross section to propagule transplant container size ratio,
 a plant punch element cross section to propagule transplant container size ratio of at most about 0.75:1,
 a plant punch element cross section to propagule transplant container size ratio of at most about 0.50:1,
 a plant punch element cross section to propagule transplant container size ratio of at most about 0.25:1,
 a moisture coordinated propagule transplant container size,
 a container edge moisture coordinated propagule transplant container size,
 a moisture deficit area coordinated propagule transplant container size,
 a stem type coordinated propagule transplant container size,
 a stem stretch up avoidance factor,
 a leaf type coordinated propagule transplant container size,
 a leaf overlap avoidance factor,
 a sub-leaf micro environment control factor,
 a shade coordinated propagule transplant container size,
 a media dry-out avoidance factor,
 a leaf fit-through propagule transplant container size,
 a root coordinated propagule transplant container size,
 a root disturbance avoidance propagule transplant container size,
 a propagule transplant container volume to root volume ratio of at least about 5:1,
 a propagule transplant container volume to root volume ratio of at least about 3:1,
 a plant punch type coordinated propagule transplant container size,
 a plant punch size coordinated propagule transplant container size,
 a climate coordinated propagule transplant container size,
 a location coordinated propagule transplant container size,
 a location factor criterion,
 an initial growth location factor criterion,
 a secondary growth location factor criterion,
 a delivery location factor criterion,
 a location maturity of about 0.8 of a typical mid-latitude US transplant maturity,
 a location maturity of about 0.9 of a typical mid-latitude US transplant maturity,
 a location maturity of about 1.1 of a typical mid-latitude mid-spring planting US transplant maturity
 a location maturity of about 1.2 of a typical mid-latitude mid-spring planting US transplant maturity
 a location maturity of about 1.3 of a typical mid-latitude mid-spring planting US transplant maturity
 a location maturity of about 1.4 of a typical mid-latitude mid-spring planting US transplant maturity
 a location maturity of about 1.5 of a typical mid-latitude mid-spring planting US transplant maturity,
 a species coordinated propagule transplant container size, and
 a season of transplant coordinated propagule transplant container size.

9. A method of cultivating plants comprising the steps of:
 a. determining at least one externally manifested punch-transplant-specific transplant-plant-size-excluded morphological growth criterion appropriate to a given plant species and a given transplant modality;
 b. placing growth media and a plurality of propagules for said plant species in a first matrix of propagule transplant containers;
 c. interconnecting said first matrix of propagule transplant containers by a formable web;
 d. nurturing an initial growth of said propagules for said plant species in said first matrix of propagule transplant containers to create a first growth matrix of juvenile plantlets;
 e. establishing a matrix of individual transplant cohesive intermingled plant-media masses from a portion of said growth media and each of said juvenile plantlets;
 f. affirmatively establishing said at least one externally manifested punch-transplant-specific transplant-plant-size-excluded morphological growth criterion for a substantial portion of said plurality of juvenile plantlets while situated in said first matrix of propagule transplant containers;
 g. extruding a substantial portion of an individual transplant cohesive intermingled plant-media mass from a propagule transplant container at a time when said punch-transplant-specific transplant-plant-size-excluded morphological growth criterion is substantially established;
 h. inserting at least one individual transplant cohesive intermingled plant-media mass in an adolescent plant container immediately after extruding a substantial portion of an individual transplant cohesive intermingled plant-media mass from said propagule transplant container; and
 i. secondarily growing said juvenile plantlet in said adolescent plant container to create an adolescent plant.

10. A method of cultivating plants as described in claim 9 wherein said step of inserting at least one individual transplant cohesive intermingled plant-media mass in an adolescent plant container immediately after extruding a substantial portion of an individual transplant cohesive intermingled plant-media mass from said propagule transplant container comprises the step of continuately inserting at least one individual transplant cohesive intermingled plant-media mass in an adolescent plant container immediately after extruding a substantial portion of an individual transplant cohesive intermingled plant-media mass from said propagule transplant container.

11. A method of cultivating plants as described in claim 10 and further comprising the step of close tolerance positioning said adolescent plant container with respect to said first growth matrix of juvenile plantlets prior to accomplishing said step of inserting at least one individual transplant cohesive intermingled plant-media mass in said adolescent plant container.

12. A method of cultivating plants as described in claim 9 wherein said step of nurturing an initial growth of said propagules for said plant species in said first matrix of propagule transplant containers to create a first growth matrix of juvenile plantlets comprises the step of utilizing a controlled environment and wherein said step of secondarily growing said juvenile plantlet in said adolescent plant container to create an adolescent plant comprises the step of utilizing a controlled environment.

13. A method of cultivating plants as described in claim 12 and further comprising the step of subjecting said juvenile plantlets to a new environment prior to accomplishing the step of extruding a substantial portion of an individual transplant cohesive intermingled plant-media mass from a propagule transplant container.

14. A method of cultivating plants as described in claim 12 and further comprising the step of pre-transplant conditioning said juvenile plantlets to a new environment prior to accomplishing said step of extruding a substantial portion of an individual transplant cohesive intermingled plant-media mass from said propagule transplant container.

15. A method of cultivating plants as described in claim 12 and further comprising the step of transplanting said juvenile plantlets at a time selected from at least one of a group consisting of:
    at least about 2 days after accomplishing said step of pre-transplant shipping,
    at least about 3 days after accomplishing said step of pre-transplant shipping,
    at least about 5 days after accomplishing said step of pre-transplant shipping, and
    at least about 7 days after accomplishing said step of pre-transplant shipping.

16. A method of cultivating plants as described in claim 9 wherein said step of inserting said at least one individual transplant cohesive intermingled plant-media mass in an adolescent plant container comprises the step of inserting a plurality of individual transplant cohesive intermingled plant-media masses in an adolescent plant container matrix.

17. A method of cultivating plants as described in claim 16 wherein said step of extruding a substantial portion of an individual transplant cohesive intermingled plant-media mass from a propagule transplant container comprises the step of simultaneously extruding a substantial portion of a plurality of individual transplant cohesive intermingled plant-media masses from a plurality of propagule transplant containers in said first matrix of propagule transplant containers and wherein said step of inserting a plurality of individual transplant cohesive intermingled plant-media masses in an adolescent plant container matrix comprises the step of simultaneously inserting a plurality of individual transplant cohesive intermingled plant-media masses in said adolescent plant container matrix.

18. A method of cultivating plants as described in claim 9 wherein said step of determining at least one externally manifested punch-transplant-specific transplant-plant-size-excluded morphological growth criterion comprises the step of utilizing multifactorial punch-transplant-specific transplant-plant-size-excluded morphological growth criterion appropriate to a given plant species and a given transplant modality.

19. A method of cultivating plants as described in claim 18 wherein said step of utilizing multifactorial punch-transplant-specific transplant-plant-size-excluded morphological growth criterion appropriate to a given plant species and a given transplant modality comprises the step of selecting yield maximization effects involving said multifactorial punch-transplant-specific transplant-plant-size-excluded morphological growth criterion.

20. A method of cultivating plants as described in claim 19 wherein said step of selecting yield maximization effects involving said multifactorial punch-transplant-specific transplant-plant-size-excluded morphological growth criterion comprises the step of selecting a plurality of yield maximization effects involving at least one of a group of factors consisting of:
    the amount of light received,
    the specific fertilizers utilized,
    the amount of water received,
    the humidity involved,
    the temperature involved,
    the insects present in the environment,
    the location involved at any growth stage,
    the latitude involved at any growth stage,
    the time of year involved at any growth stage,
    the growing season,
    the amount of time allotted for growth,
    the plant development stage at transplant,
    any specific growth environment involved,
    the planned time of transplant,
    the transplant environment utilized,
    the transplant procedures utilized,
    the transplant device utilized,
    the seedling environment utilized,
    the leaf type of the species involved,
    the stem type of the species involved,
    the root type of the species involved,
    the propagule transplant container size utilized,
    the leaf size of the propagule involved the moisture uniformity involved,
    a ratio involving any of the foregoing factors,
    all combinations of any of the forgoing factors,
    and all permutations of any of the foregoing factors.

21. A method of cultivating plants as described in claim 9 wherein said step of determining at least one externally manifested punch-transplant-specific transplant-plant-size-excluded morphological growth criterion comprises the step of coordinating at least one transplant system aspect with at least one externally
    manifested punch-transplant-specific transplant-plant-size-excluded morphological growth criterion.

22. A method of cultivating plants as described in claim 21 wherein said step of coordinating at least one transplant system aspect with at least one externally manifested punch-transplant-specific transplant-plant-size-excluded morphological growth criterion comprises the step of considering specific mechanical actions of said transplant system in determining a stage of development at which said plantlet is extruded from said propagule transplant container.

23. A method of cultivating plants as described in claim 21 wherein said step of coordinating at least one transplant system aspect with at least one externally manifested punch-transplant-specific transplant-plant-size-excluded morphological growth criterion comprises the step of relating a transplant system dimension to a propagule transplant container size value.

24. A method of cultivating plants as described in claim 21 wherein said step of coordinating at least one transplant system aspect with at least one externally manifested punch-transplant-specific transplant-plant-size-excluded morphological growth criterion comprises the step of optimizing the average development stage of said propagules at the time of transplant for a transplant system being utilized.

25. A method of cultivating plants as described in claim 24 wherein said step of optimizing the average development stage of said propagules at the time of transplant for a transplant system being utilized comprises the step of relating said average development stage of said propagules to factors selected from at least one of a group consisting of:
  a propagule transplant container dimension value,
  a plant punch element dimension value,
  a plant dimension value,
  a leaf dimension value,
  a ratio involving any of the foregoing factors,
  all combinations of any of the forgoing factors, and
  all permutations of any of the foregoing factors.

26. A method of cultivating plants as described in claim 9 wherein said step of determining at least one externally manifested punch-transplant-specific transplant-plant-size-excluded morphological growth criterion comprises the step of selecting an apparent maturity factor from at least one of a group consisting of:
  an average development of about 100 percent of a mature development,
  an average development of about 95 percent of a mature development,
  an average development of about 85 percent of a mature development,
  an average development of about 75 percent of a mature development,
  an average development of about 65 percent of a mature development,
  an average development of about 30 percent of a mature development,
  an average development of about 20 percent of a mature development,
  an average development of about 10 percent of a mature development, and
  an average development of about 5 percent of a mature development.

27. A method of cultivating plants as described in claim 26 wherein said step of selecting an apparent maturity factor comprises the step of estimating said apparent maturity factor by utilizing a time of growth for transplant.

28. A method of cultivating plants as described in claim 9 wherein said step of determining at least one externally manifested punch-transplant-specific transplant-plant-size-excluded morphological growth criterion comprises the step of utilizing at least one highly yield sensitive criterion and further comprising the step of achieving an enhanced production yield which is statistically increased over a traditional transplant production yield for said species.

29. A method of cultivating plants as described in claim 28 wherein said step of achieving an enhanced production yield which is statistically increased over a traditional transplant production yield for said species comprises the step of achieving a production yield selected from at least one of a group consisting of:
  greater than about an eighty-five percent production yield,
  greater than about an ninety percent production yield, and
  greater than about an ninety-five percent production yield.

30. A method of cultivating plants as described in claim 9 wherein said step of affirmatively establishing said at least one externally manifested punch-transplant-specific transplant-plant-size-excluded morphological growth criterion comprises the step of precisely establishing a specific-tray optimized morphological growth criterion.

31. A method of cultivating plants as described in claim 9 wherein said step of affirmatively establishing said at least one externally manifested punch-transplant-specific transplant-plant-size-excluded morphological growth criterion comprises the step of establishing an optimized morphological growth criterion selected from at least one of a group consisting of:
  a species to propagule transplant container size ratio,
  a propagule transplant container density value of at most about 0.33 containers per square centimeter,
  a leaf area to propagule transplant container size ratio,
  a leaf area to propagule transplant container size ratio of at most about 1:1,
  a leaf area to propagule transplant container size ratio of at most about 2:1,
  a leaf area to propagule transplant container size ratio of at most about 3:1,
  a species based leaf area to propagule transplant container size ratio,
  an upright plant type leaf area to propagule transplant container size ratio,
  an multi-branched plant type leaf area to propagule transplant container size ratio,
  a plant punch element cross section to propagule transplant container size ratio,
  a plant punch element cross section to propagule transplant container size ratio of at most about 0.75:1,
  a plant punch element cross section to propagule transplant container size ratio of at most about 0.50:1,
  a plant punch element cross section to propagule transplant container size ratio of at most about 0.25:1,
  a moisture coordinated propagule transplant container size,
  a container edge moisture coordinated propagule transplant container size,
  a moisture deficit area coordinated propagule transplant container size,
  a stem type coordinated propagule transplant container size,
  a stem stretch up avoidance factor,
  a leaf type coordinated propagule transplant container size,
  a leaf overlap avoidance factor,
  a sub-leaf micro environment control factor,
  a shade coordinated propagule transplant container size,
  a media dry-out avoidance factor,
  a leaf fit-through propagule transplant container size,
  a root coordinated propagule transplant container size,
  a root disturbance avoidance propagule transplant container size,
  a propagule transplant container volume to root volume ratio of at least about 5:1,
  a propagule transplant container volume to root volume ratio of at least about 3:1,
  a plant punch type coordinated propagule transplant container size,
  a plant punch size coordinated propagule transplant container size, a climate coordinated propagule transplant container size,
a location coordinated propagule transplant container size,
a location factor criterion,
an initial growth location factor criterion,
a secondary growth location factor criterion,
a delivery location factor criterion,
a location maturity of about 0.8 of a typical mid-latitude US transplant maturity,
a location maturity of about 0.9 of a typical mid-latitude US transplant maturity,
a location maturity of about 1.1 of a typical mid-latitude mid-spring planting US transplant maturity,
a location maturity of about 1.2 of a typical mid-latitude mid-spring planting US transplant maturity
a location maturity of about 1.3 of a typical mid-latitude mid-spring planting US transplant maturity
a location maturity of about 1.4 of a typical mid-latitude mid-spring planting US transplant maturity
a location maturity of about 1.5 of a typical mid-latitude mid-spring planting US transplant maturity,
a species coordinated propagule transplant container size, and
a season of transplant coordinated propagule transplant container size.

32. A method of cultivating plants as described in claim 9 wherein said step of affirmatively establishing said at least one externally manifested punch-transplant-specific transplant-plant-size-excluded morphological growth criterion comprises the step of establishing any moisture deficit areas away from a root of said propagule.

33. A method of cultivating plants comprising the steps of:
a. establishing a subdued density matrix of propagule transplant containers arranged in a rectilinear matrix, each propagule transplant container having a cross sectional area, a bottom, and having exterior dimensions;
b. placing growth media and a plurality of propagules for said plant species in said propagule transplant containers;
c. interconnecting said subdued density matrix of propagule transplant containers by a formable web;
d. nurturing an initial growth of said propagules for said plant species in said first matrix of propagule transplant containers to create a first growth matrix of juvenile plantlets;
e. establishing a matrix of individual transplant cohesive intermingled plant-media masses from a portion of said growth media and each of said juvenile plantlets;
f. extruding a substantial portion of an individual transplant cohesive intermingled plant-media mass from a propagule transplant container;
g. inserting at least one individual transplant cohesive intermingled plant-media mass in an adolescent plant container immediately after extruding a substantial portion of an individual transplant cohesive intermingled plant-media mass from said propagule transplant container; and
h. secondarily growing said juvenile plantlet in said adolescent plant container to create an adolescent plant.

34. A method of cultivating plants as described in claim 33 wherein said step of establishing a subdued density matrix of propagule transplant containers comprises the step of establishing a propagule transplant container density value of at most about 0.33 containers per square centimeter.

35. A method of cultivating plants as described in claim 33 or 34 wherein said step of interconnecting said subdued density matrix of propagule transplant containers by a formable web comprises the step of utilizing an excess web area matrix.

36. A method of cultivating plants comprising the steps of:
a. establishing a matrix of area extravagant propagule transplant containers arranged in a rectilinear matrix, each propagule transplant container having an extravagant cross sectional area relative to a transplant stage plantlet of a species, a bottom, and having exterior dimensions;
b. placing growth media and a plurality of propagules for said plant species in said propagule transplant containers;
c. interconnecting said propagule transplant containers by a formable web;
d. nurturing an initial growth of said propagules for said plant species in said first matrix of propagule transplant containers to create a first growth matrix of juvenile plantlets;
e. establishing a matrix of individual transplant cohesive intermingled plant-media masses from a portion of said growth media and each of said juvenile plantlets;
f. extruding a substantial portion of an individual transplant cohesive intermingled plant-media mass from a propagule transplant container;
g. Inserting at least one individual transplant cohesive intermingled plant-media mass in an adolescent plant container immediately after extruding a substantial portion of an individual transplant cohesive intermingled plant-media mass from said propagule transplant container; and
h. secondarily growing said juvenile plantlet in said adolescent plant container to create an adolescent plant.

37. A method of cultivating plants as described in claim 36 wherein said step of establishing a matrix of area extravagant propagule transplant containers comprises the step of establishing propagule transplant containers having an area of at least about 1.95 square centimeters.

38. A method of cultivating plants as described in claim 36 wherein said step of establishing a matrix of area extravagant propagule transplant containers comprises the step of utilizing a plurality of leaf canopy area transplant containers.

39. A method of cultivating plants as described in claim 36 wherein said step of establishing a matrix of area extravagant propagule transplant containers comprises the step of utilizing a plurality of excess root area transplant containers.

40. A method of cultivating plants as described in claim 36 wherein said step of establishing a matrix of area extravagant propagule transplant containers comprises the step of utilizing a plurality of post transplant growth sized containers.

41. A method of cultivating plants comprising the steps of:
a. establishing a matrix of volume extravagant propagule transplant containers arranged in a rectilinear matrix, each propagule transplant container having an extravagant volume relative to a transplant stage plantlet of a species, a bottom, and having exterior dimensions;
b. placing growth media and a plurality of propagules for said plant species in said propagule transplant containers;
c. interconnecting said propagule transplant containers by a formable web;
d. nurturing an initial growth of said propagules for said plant species in said first matrix of propagule transplant containers to create a first growth matrix of juvenile plantlets;

e. establishing a matrix of individual transplant cohesive intermingled plant-media masses from a portion of said growth media and each of said juvenile plantlets;
f. extruding a substantial portion of an individual transplant cohesive intermingled plant-media mass from a propagule transplant container;
g. inserting at least one individual transplant cohesive intermingled plant-media mass in an adolescent plant container immediately after extruding a substantial portion of an individual transplant cohesive intermingled plant-media mass from said propagule transplant container; and
h. secondarily growing said juvenile plantlet in said adolescent plant container to create an adolescent plant.

42. A method of cultivating plants as described in claim 41 wherein said step of establishing a matrix of volume extravagant propagule transplant containers comprises the step of establishing propagule transplant containers having a volume of at least about 3 cubic centimeters.

43. A method of cultivating plants as described in claim 41 wherein said step of establishing a matrix of volume extravagant propagule transplant containers comprises the step of utilizing a plurality of excess root volume containers.

44. A method of cultivating plants as described in claim 33, 36, or 41 and further comprising the step of utilizing an automatic transplant system.

45. A method of cultivating plants as described in claim 44 wherein said step of utilizing an automatic transplant system comprises the step of continuately inserting at least one individual transplant cohesive intermingled plant-media mass in an adolescent plant container.

46. A method of cultivating plants as described in claim 45 and further comprising the step of close tolerance positioning said adolescent plant container with respect to said matrix of propagule containers.

47. A method of cultivating plants as described in claim 45 wherein said step of utilizing an automatic transplant system comprises the steps of:
a. simultaneously extruding a substantial portion of a plurality of individual transplant cohesive intermingled plant-media masses from a plurality of propagule transplant containers; and
b. simultaneously inserting a plurality of individual transplant cohesive intermingled plant-media masses in a plurality of adolescent plant containers.

48. A method of cultivating plants as described in claim 47 and further comprising the step of utilizing a controlled environment at some time both before and after accomplishing said step of simultaneously extruding a substantial portion of a plurality of individual transplant cohesive intermingled plant-media masses from a plurality of propagule transplant containers.

49. A method of cultivating plants as described in claim 33, 36, or 41 wherein said matrix of propagule containers comprises a matrix adapted to achieve an enhanced production yield which is statistically increased over a traditional transplant production yield for said species.

50. A method of cultivating plants as described in claim 49 wherein said matrix of propagule containers comprises a matrix adapted to achieve an enhanced production yield which is statistically increased over a traditional transplant production yield for a species comprises the step of achieving a production yield selected from at least one of of a group consisting of:
greater than about an eighty-five percent production yield, greater than about an ninety percent production yield, and greater than about an ninety-five percent production yield.

51. A method of cultivating plants as described in claim 33 and further comprising the step of establishing an optimized transplant-plant-size-excluded morphological growth criterion selected from at least one of a group consisting of:
a species to propagule transplant container size ratio,
a propagule transplant container density value of at most about 0.33 containers per square centimeter,
a leaf area to propagule transplant container size ratio,
a leaf area to propagule transplant container size ratio of at most about 1:1,
a leaf area to propagule transplant container size ratio of at most about 2:1,
a leaf area to propagule transplant container size ratio of at most about 3:1,
a species based leaf area to propagule transplant container size ratio,
an upright plant type leaf area to propagule transplant container size ratio,
an multi-branched plant type leaf area to propagule transplant container size ratio,
a plant punch element cross section to propagule transplant container size ratio,
a plant punch element cross section to propagule transplant container size ratio of at most about 0.75:1,
a plant punch element cross section to propagule transplant container size ratio of at most about 0.50:1,
a plant punch element cross section to propagule transplant container size ratio of at most about 0.25:1,
a moisture coordinated propagule transplant container size,
a container edge moisture coordinated propagule transplant container size,
a moisture deficit area coordinated propagule transplant container size,
a stem type coordinated propagule transplant container size,
a stem stretch up avoidance factor,
a leaf type coordinated propagule transplant container size,
a leaf overlap avoidance factor,
a sub-leaf micro environment control factor,
a shade coordinated propagule transplant container size,
a media dry-out avoidance factor,
a leaf fit-through propagule transplant container size,
a root coordinated propagule transplant container size,
a root disturbance avoidance propagule transplant container size,
a propagule transplant container volume to root volume ratio of at least about 5:1,
a propagule transplant container volume to root volume ratio of at least about 3:1,
a plant punch type coordinated propagule transplant container size,
a plant punch size coordinated propagule transplant container size,
a climate coordinated propagule transplant container size,
a location coordinated propagule transplant container size,
a location factor criterion,
an initial growth location factor criterion,
a secondary growth location factor criterion,
a delivery location factor criterion,
a location maturity of about 0.8 of a typical mid-latitude US transplant maturity,
a location maturity of about 0.9 of a typical mid-latitude US transplant maturity, a location maturity of about 1.1 of a typical mid-latitude mid-spring planting US transplant maturity a location maturity of about 1.2 of a typical mid-latitude mid-spring planting US transplant maturity a location maturity of about 1.3 of a typical mid-latitude mid-spring planting US transplant maturity a location maturity of about 1.4 of a typical mid-latitude mid-spring planting US transplant maturity a location maturity of about 1.5 of a typical mid-latitude mid-spring planting US transplant maturity, a species coordinated propagule transplant container size, and a season of transplant coordinated propagule transplant container size.

52. A method of cultivating plants as described in claim 33, 36, or 41 and further comprising the steps of:
   a. determining at least one externally manifested punch-transplant-specific transplant-plant-size-excluded morphological growth criterion appropriate to a given plant species and a given transplant modality; and
   b. affirmatively establishing said at least one externally manifested punch-transplant-specific transplant-plant-size-excluded morphological growth criterion for a substantial portion of a plurality of juvenile plantlets while situated in said propagule transplant containers.

53. A method of cultivating plants as described in claim 52 and further comprising the step of continuately inserting at least one individual transplant cohesive intermingled plant-media mass in an adolescent plant container immediately after extruding a substantial portion of an individual transplant cohesive intermingled plant-media mass from said propagule transplant container.

54. A method of cultivating plants as described in claim 9, 20, 29, 31, 36 or 41 wherein said step of interconnecting said first matrix of propagule transplant containers by a formable web comprises the step of utilizing a subdued density matrix of propagule transplant containers arranged in a rectilinear matrix.

55. A method of cultivating plants as described in claim 9, 20, 29, 31, or 33 wherein said step of placing growth media and a plurality of propagules for said plant species in a first matrix of propagule transplant containers comprises the step of utilizing a matrix of area extravagant propagule transplant containers.

56. A method of cultivating plants as described in claim 9, 20, 29, 31, or 33 wherein said step of placing growth media and a plurality of propagules for said plant species in a first matrix of propagule transplant containers comprises the step of utilizing a matrix of volume extravagant propagule transplant containers.

57. A method of cultivating plants as described in claim 9, 20, 29, 31, 33, 36, or 41 and further comprising the step of predibbling said adolescent plant container prior to accomplishing said step of inserting at least one individual transplant cohesive intermingled plant-media mass in said adolescent plant container.

58. A method of cultivating plants as described in claim 9, 20, 29, 31, 33, 36, or 41 and further comprising the step of creating a sequence of automated movements as part of a transplant process.

59. A method of cultivating plants as described in claim 58 wherein said step of creating a sequence of automated movements as part of a transplant process comprises the steps of:
   a. utilizing an automated forward tray movement; and
   b. utilizing an automated side-to-side tray movement.

60. A method of cultivating plants as described in claim 9, 20, 29, 31, 33, 36, or 41 and further comprising the steps of:
   a. utilizing a coordinated number propagule transplant container matrix; and
   b. utilizing a coordinated number adolescent plant container matrix.

61. A method of cultivating plants as described in claim 33 wherein said step of establishing a subdued density matrix of propagule transplant containers comprises the step of establishing a leaf overlap avoidance matrix.

62. A method of cultivating plants as described in claim 50 and further comprising the step of establishing an optimized transplant-plant-size-excluded morphological growth criterion selected from at least one of a group consisting of:
   a species to propagule transplant container size ratio,
   a propagule transplant container density value of at most about 0.33 containers per square centimeter,
   a leaf area to propagule transplant container size ratio,
   a leaf area to propagule transplant container size ratio of at most about 1:1,
   a leaf area to propagule transplant container size ratio of at most about 2:1,
   a leaf area to propagule transplant container size ratio of at most about 3:1,
   a species based leaf area to propagule transplant container size ratio,
   an upright plant type leaf area to propagule transplant container size ratio,
   an multi-branched plant type leaf area to propagule transplant container size ratio,
   a plant punch element cross section to propagule transplant container size ratio,
   a plant punch element cross section to propagule transplant container size ratio of at most about 0.75:1,
   a plant punch element cross section to propagule transplant container size ratio of at most about 0.50:1,
   a plant punch element cross section to propagule transplant container size ratio of at most about 0.25:1,
   a moisture coordinated propagule transplant container size,
   a container edge moisture coordinated propagule transplant container size,
   a moisture deficit area coordinated propagule transplant container size,
   a stem type coordinated propagule transplant container size,
   a stem stretch up avoidance factor,
   a leaf type coordinated propagule transplant container size,
   a leaf overlap avoidance factor,
   a sub-leaf micro environment control factor,
   a shade coordinated propagule transplant container size,
   a media dry-out avoidance factor,
   a leaf fit-through propagule transplant container size,
   a root coordinated propagule transplant container size,
   a root disturbance avoidance propagule transplant container size,
   a propagule transplant container volume to root volume ratio of at least about 5:1,
   a propagule transplant container volume to root volume ratio of at least about 3:1,
   a plant punch type coordinated propagule transplant container size,
   a plant punch size coordinated propagule transplant container size,
   a climate coordinated propagule transplant container size, a location coordinated propagule transplant container size,
  a location factor criterion,
  an initial growth location factor criterion,
  a secondary growth location factor criterion,
  a delivery location factor criterion,
  a location maturity of about 0.8 of a typical mid-latitude US transplant maturity,
  a location maturity of about 0.9 of a typical mid-latitude US transplant maturity,
  a location maturity of about 1.1 of a typical mid-latitude mid-spring planting US transplant maturity
  a location maturity of about 1.2 of a typical mid-latitude mid-spring planting US transplant maturity
  a location maturity of about 1.3 of a typical mid-latitude mid-spring planting US transplant maturity
  a location maturity of about 1.4 of a typical mid-latitude mid-spring planting US transplant maturity
  a location maturity of about 1.5 of a typical mid-latitude mid-spring planting US transplant maturity,
  a species coordinated propagule transplant container size, and
  a season of transplant coordinated propagule transplant container size.

63. A method of cultivating plants as described in claim 45 and further comprising the steps of:
  a. determining at least one externally manifested punch-transplant-specific transplant-plant-size-excluded morphological growth criterion appropriate to a given plant species and a given transplant modality; and
  b. affirmatively establishing said at least one externally manifested punch-transplant-specific transplant-plant-size-excluded morphological growth criterion for a substantial portion of a plurality of juvenile plantlets while situated in said propagule transplant containers.

64. A method of cultivating plants as described in claim 63 and further comprising the step of continuately inserting at least one individual transplant cohesive intermingled plant-media mass in an adolescent plant container immediately after extruding a substantial portion of an individual transplant cohesive intermingled plant-media mass from said propagule transplant container.

65. A method of cultivating plants as described in claim 45 wherein said step of interconnecting said first matrix of propagule transplant containers by a formable web comprises the step of utilizing a subdued density matrix of propagule transplant containers arranged in a rectilinear matrix.

66. A method of cultivating plants as described in claim 45 wherein said step of placing growth media and a plurality of propagules for said plant species in a first matrix of propagule transplant containers comprises the step of utilizing a matrix of area extravagant propagule transplant containers.

67. A method of cultivating plants as described in claim 54 wherein said step of placing growth media and a plurality of propagules for said plant species in a first matrix of propagule transplant containers comprises the step of utilizing a matrix of area extravagant propagule transplant containers.

68. A method of cultivating plants as described in claim 65 wherein said step of placing growth media and a plurality of propagules for said plant species in a first matrix of propagule transplant containers comprises the step of utilizing a matrix of area extravagant propagule transplant containers.

69. A method of cultivating plants as described in claim 45 wherein said step of placing growth media and a plurality of propagules for said plant species in a first matrix of propagule transplant containers comprises the step of utilizing a matrix of volume extravagant propagule transplant containers.

70. A method of cultivating plants as described in claim 54 wherein said step of placing growth media and a plurality of propagules for said plant species in a first matrix of propagule transplant containers comprises the step of utilizing a matrix of volume extravagant propagule transplant containers.

71. A method of cultivating plants as described in claim 65 wherein said step of placing growth media and a plurality of propagules for said plant species in a first matrix of propagule transplant containers comprises the step of utilizing a matrix of volume extravagant propagule transplant containers.

72. A method of cultivating plants as described in claim 45 and further comprising the steps of:
  a. utilizing a coordinated number propagule transplant container matrix; and
  b. utilizing a coordinated number adolescent plant container matrix.

73. A method of cultivating plants as described in claim 54 and further comprising the steps of:
  a. utilizing a coordinated number propagule transplant container matrix; and
  b. utilizing a coordinated number adolescent plant container matrix.

74. A method of cultivating plants as described in claim 65 and further comprising the steps of:
  a. utilizing a coordinated number propagule transplant container matrix; and
  b. utilizing a coordinated number adolescent plant container matrix.

75. A method of cultivating plants as described in claim 55 and further comprising the steps of:
  a. utilizing a coordinated number propagule transplant container matrix; and
  b. utilizing a coordinated number adolescent plant container matrix.

76. A method of cultivating plants as described in claim 66 and further comprising the steps of:
  a. utilizing a coordinated number propagule transplant container matrix; and
  b. utilizing a coordinated number adolescent plant container matrix.

77. A method of cultivating plants as described in claim 67 and further comprising the steps of:
  a. utilizing a coordinated number propagule transplant container matrix; and
  b. utilizing a coordinated number adolescent plant container matrix.

78. A method of cultivating plants as described in claim 68 and further comprising the steps of:
  a. utilizing a coordinated number propagule transplant container matrix; and
  b. utilizing a coordinated number adolescent plant container matrix.

79. A method of cultivating plants as described in claim 57 and further comprising the steps of:
  a. utilizing a coordinated number propagule transplant container matrix; and
  b. utilizing a coordinated number adolescent plant container matrix.

80. A method of cultivating plants as described in claim 45 and further comprising the step of predibbling said adolescent plant container prior to accomplishing said step of inserting at least one individual transplant cohesive intermingled plant-media mass in said adolescent plant container.

81. A method of cultivating plants as described in claim 54 and further comprising the step of predibbling said adolescent plant container prior to accomplishing said step of inserting at least one individual transplant cohesive intermingled plant-media mass in said adolescent plant container.

82. A method of cultivating plants as described in claim 65 and further comprising the step of predibbling said adolescent plant container prior to accomplishing said step of inserting at least one individual transplant cohesive intermingled plant-media mass in said adolescent plant container.

83. A method of cultivating plants as described in claim 66 and further comprising the step of predibbling said adolescent plant container prior to accomplishing said step of inserting at least one individual transplant cohesive intermingled plant-media mass in said adolescent plant container.

84. A method of cultivating plants as described in claim 67 and further comprising the step of predibbling said adolescent plant container prior to accomplishing said step of inserting at least one individual transplant cohesive intermingled plant-media mass in said adolescent plant container.

85. A method of cultivating plants as described in claim 68 and further comprising the step of predibbling said adolescent plant container prior to accomplishing said step of inserting at least one individual transplant cohesive intermingled plant-media mass in said adolescent plant container.

* * * * *